US010375813B2

(12) United States Patent
Dupont-Nivet et al.

(10) Patent No.: US 10,375,813 B2
(45) Date of Patent: Aug. 6, 2019

(54) ON-CHIP TRAPPED ULTRACOLD ATOM SENSOR ALLOWING ROTATIONAL VELOCITY TO BE MEASURED

(71) Applicant: THALES, Courbevoie (FR)

(72) Inventors: Matthieu Dupont-Nivet, Palaiseau (FR); Sylvain Schwartz, Palaiseau (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 15/778,605

(22) PCT Filed: Nov. 24, 2016

(86) PCT No.: PCT/EP2016/078722
§ 371 (c)(1),
(2) Date: May 23, 2018

(87) PCT Pub. No.: WO2017/089489
PCT Pub. Date: Jun. 1, 2017

(65) Prior Publication Data
US 2018/0352642 A1 Dec. 6, 2018

(30) Foreign Application Priority Data

Nov. 27, 2015 (FR) ...................................... 15 02482

(51) Int. Cl.
*G01C 19/64* (2006.01)
*H05H 3/00* (2006.01)

(52) U.S. Cl.
CPC .............. *H05H 3/00* (2013.01); *G01C 19/64* (2013.01)

(58) Field of Classification Search
CPC ... G21K 1/00; H05H 3/02; H05H 3/04; G01C 19/60; G01C 19/64
See application file for complete search history.

(56) References Cited

U.S. PATENT DOCUMENTS 7,030,370 B1   4/2006 Crookston et al.

FOREIGN PATENT DOCUMENTS

CN    102 927 978 A    2/2013

OTHER PUBLICATIONS

Alzar, et al., "Towards high sensitivity rotation sensing using an atom chip", High Intensity Lasers and High Field Phenomena, pp. JT2A-10, Optical Society of America, Mar. 2012.
(Continued)

*Primary Examiner* — Hwa Andrew Lee
(74) *Attorney, Agent, or Firm* — Baker & Hostetler LLP

(57) ABSTRACT

Ultra-cold atom sensor for measuring a rotational velocity along a measurement axis comprises: means designed to generate a first and a second ultra-cold atom trap, one trap making it possible to immobilize a cloud of ultra-cold atoms in an internal state different from the other trap, at a predetermined distance from the measurement plane, the means comprising, at least one first and one second waveguide that are designed to propagate microwaves with angular frequencies $\omega_a$ and $\omega_b$, the waveguides being non-secant and positioned symmetrically about an axis called the axis of symmetry, conductive wires integrated into the chip and designed to be flowed through by DC currents, the means being configured to modify the energy of the ultra-cold atoms in such a way as to create a potential minimum for the ultra-cold atoms in the internal state |a> and a potential minimum for the ultra-cold atoms in the internal state |b>, thus forming the first and second ultra-cold atom traps, and to move the traps along a closed path, traveled in one direction by the ultra-cold atoms of the first trap and in the opposite direction by the ultra-cold atoms of the second trap.

16 Claims, 20 Drawing Sheets

(56) References Cited

OTHER PUBLICATIONS

Stephen Richard Segal et al., "Progress towards an ultracold atomic Sagnac gyroscope," Jan. 1, 2010, XP055279050.
P. Lee et al., "Cold Atom Optics on a Chip," Jan. 15, 2015, XP055300454.
M. Ammar et al., "Symmetric micro-wave potentials for interferometry with thermal atoms on a chip," Physical Review A, vol. 91, 053623.

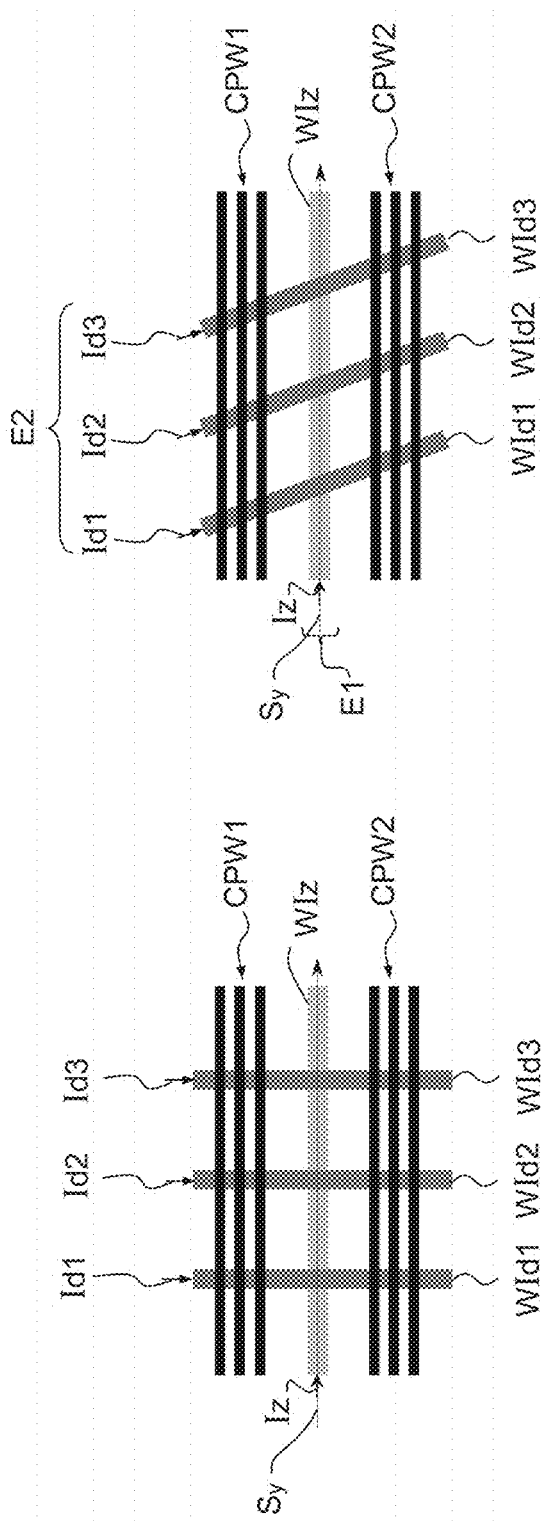

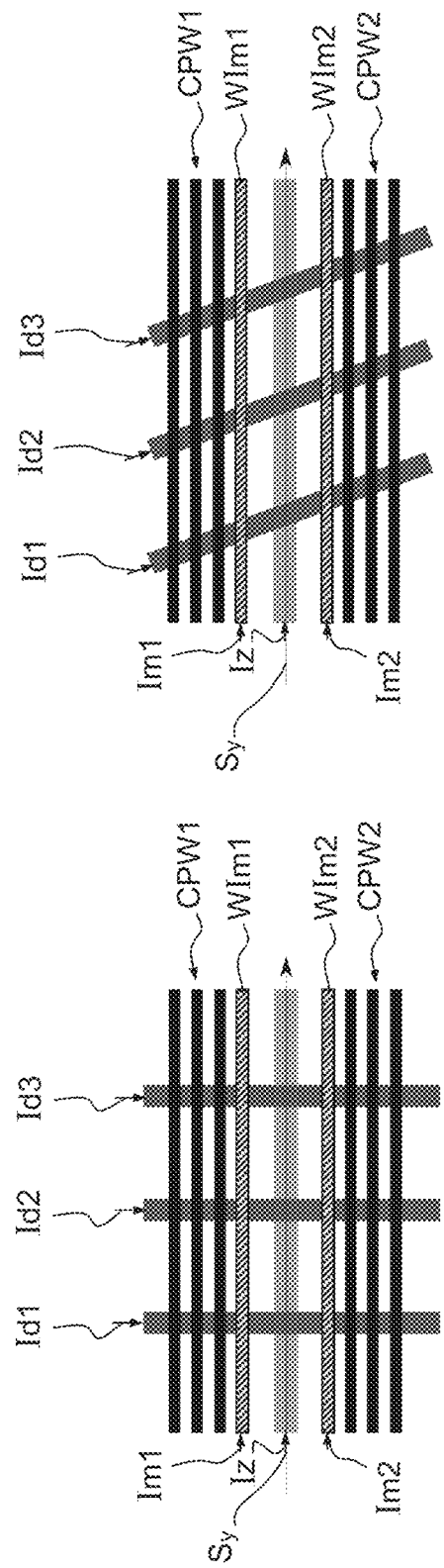

ON-CHIP TRAPPED ULTRACOLD ATOM SENSOR ALLOWING ROTATIONAL VELOCITY TO BE MEASURED

CROSS-REFERENCE TO RELATED APPLICATIONS

This application is a National Stage of International patent application PCT/EP2016/078722, filed on Nov. 24, 2016, which claims priority to foreign French patent application No. FR 1502482, filed on Nov. 27, 2015, the disclosures of which are incorporated by reference in their entirety.

FIELD OF THE INVENTION

The invention relates to systems for measuring rotational velocity, and more particularly to on-chip ultra-cold atom gyrometers.

BACKGROUND

Gyrometry was based initially on measurements performed by implementing systems based on pendulums and springs. Nowadays, it uses optical systems or matter waves. In this context, Alzar et al. (Garrido Alzar, C. L., Yan, W., & Landragin, A., 2012, March, Towards High Sensitivity Rotation Sensing Using an Atom Chip, High Intensity Lasers and High Field Phenomena, pp. JT2A-10, Optical Society of America) have proposed an on-chip compact gyroscope, using matter waves propagating in a circular magnetic guide, called waveguide by analogy with an electromagnetic waveguide. Rotational measurements on this type of device are performed by utilizing the Sagnac effect. The phase shift θ, induced by the Sagnac effect, between two counter-rotating matter waves in a reference frame rotating at the angular velocity Ω, is given by $$\theta = \frac{2Am}{\hbar}\Omega \quad (1)$$

where A is the area contained in the waveguide, m the mass of the atoms and h the reduced Planck constant. Utilizing the atomic Sagnac effect described above constitutes a technological breakthrough in the field of gyrometers that traditionally use the optical Sagnac effect: the ratio between the atomic and optical Sagnac phase shift is given, all other factors remaining the same, by the quantity $mc^2/h\nu$ and is of the order of $10^{10}$ or $10^{11}$ depending on the type of atom and the optical frequency ν under consideration. In the device disclosed by Alzar et al., ultra-cold atoms are confined within a circular magnetic waveguide. This device enables a long interrogation time of the atoms (greater than one second) and a dispersion of the propagation velocity that is small enough to utilize the interference fringes of atomic clouds during a measurement. Depositing conductive wires in a manner printed or deposited on the substrate of the chip is a typical method for producing a magnetic waveguide. Such depositions entail surface roughness, which is passed on to the morphology of the waveguide. This element constitutes a major technical problem. Specifically, when guiding cooled atoms in the waveguide, the atoms may encounter these variations that are linked to the surface roughness of the chip. From a wave mechanics viewpoint, one part of the atom may be reflected and the other transmitted, this having the effect of considerably increasing the dispersion of the cooled atoms in the waveguide, and thus potentially making it impossible to measure the Sagnac effect.

Typically, a CCD camera is used to spatially measure the density of atoms in the region of interference formation. This method requires an optical device designed for microscopy; this type of assembly is hardly compatible with embedded and/or compact applications.

Document CN102927978 describes an atomic on-chip ultra-cold atom sensor comprising two microwave waveguides 10 and 11 that are parallel with one another in a direction x, two conductive wires 8 and 9, also in the direction x and arranged on each side of the waveguides, and a plurality of n conductive wires g1, g2, . . . , gn in a perpendicular direction y, as illustrated in FIG. 1.

Ultra-cold atoms having two internal states |a> and |b> are generated.

The combination of the potentials created by the waveguides and the conductive wires, in combination with the homogeneous magnetic field, is supposed to create two potential minima constituting two ultra-cold atom three-dimensional traps, one trap for each internal state. The various currents that are applied make it possible to move the traps along a path that is taken in one direction by one of the traps corresponding to the atoms in one internal state, and in the other direction by the second trap corresponding to the atoms in the other internal state.

In order for the device to operate correctly, it is necessary firstly for the two states |a> and |b> of the interferometer to superpose coherently.

Secondly, it is necessary for the two potential minima to have exactly the same level so as not to include, in the phase term measured by the interferometer, a dependence with the difference in level between the two potential minima. It is also necessary for the two potential minima to have the same curvature so as to keep a coherence time of the interferometer greater than the duration of the interferometric measurement; specifically, in the context of using thermal ultra-cold atoms, the coherence time is inversely proportional to the difference in curvature between the two potential minima.

The wire topology described in FIG. 1 of document CN102927978 does not readily make it possible to obtain two identical potential wells (equality of the curvatures and of the minima of the potentials). Specifically, the presence of the two wires 8 and 9 means that it is necessary to perfectly equalize, with very high precision, the DC currents flowing through them in order to obtain two identical wells.

The wire topology (set of 8, 9 and gi) described in FIG. 1 of document CN102927978 does not make it possible to create a trap that is sufficiently confining along the y-axis of FIG. 1 to enable effective cooling of the atoms and movement of the traps along the y-axis in a time that is shorter than the coherence time of the atomic source that is used.

The wire topology (set of wires 8, 9 and gi) described in FIG. 1 of document CN102927978 creates a magnetic trap with a minimum having a zero magnetic field. This has two consequences on the operation of the sensor:

Atomic losses through the Majorana effect during the phase of cooling the atoms; very few atoms are therefore available at the end of the cooling, resulting in a very low signal-to-noise ratio.

As the two states of the interferometer are two Zeeman sub-levels and, at a magnetic field zero, all of the Zeeman levels are degenerate, it is impossible to achieve an acceptable coherent superposition between the two states of the interferometer and therefore to initialize the sensor.

Thus, the conductive wires/microwave waveguide configuration from document CN102927978 exhibits numerous drawbacks. The invention aims to fully or partly overcome the technical problems and drawbacks linked to the wire topology in the abovementioned document.

SUMMARY OF THE INVENTION

One subject of the invention for achieving this aim is an ultra-cold atom sensor for measuring a rotational velocity along a measurement axis, said sensor comprising at least:

an electronic chip positioned in a vacuum chamber and including a measurement plane normal to said measurement axis;

an atom source arranged so as to generate a cloud of ultra-cold atoms close to said measurement plane;

an electromagnetic wave emitter designed to initialize the internal states of said ultra-cold atoms at a superposition of internal states |a> and |b>;

means designed to generate a first and a second ultra-cold atom trap, one trap making it possible to immobilize a cloud of ultra-cold atoms in an internal state different from the other trap, at a predetermined distance from said measurement plane, said means comprising:

at least one first and one second waveguide that are designed to propagate microwaves with angular frequencies $\omega_a$ and $\omega_b$, said waveguides being non-secant and positioned symmetrically about an axis called the axis of symmetry, conductive wires integrated into said chip and designed to be flowed through by DC currents, distributed into a first set comprising at least one conductive wire and a second set comprising a plurality of n conductive wires that are parallel with one another;

said sets being arranged such that the at least one conductive wire of the first set is not parallel with the conductive wires of the second set, defining n points of intersection between a conductive wire of the first set and a conductive wire of the second set, all of the points of intersection being located on the axis of symmetry, a homogeneous magnetic field generator, an optical intensity detection system designed to measure at least one population of said ultra-cold atoms in one said internal state;

at least one processor, at least one DC current or voltage generator designed to control electric currents in said conductive wires, and at least one microwave current or voltage generator connected to said waveguides, said means being configured to modify the energy of said ultra-cold atoms in such a way as to create a potential minimum for the ultra-cold atoms in the internal state |a> and a potential minimum for the ultra-cold atoms in the internal state |b>, thus forming said first and second ultra-cold atom traps, and to move said traps along a closed path, traveled in one direction by the ultra-cold atoms of the first trap and in the opposite direction by the ultra-cold atoms of the second trap.

Advantageously, said means are designed to generate uncondensed ultra-cold atom traps. Advantageously, the temperature of the ultra-cold atoms is greater than 20 nanokelvin, preferably greater than 100 nanokelvin, and less than 400 nanokelvin, preferably than 300 nanokelvin.

Advantageously, the direction of said homogeneous magnetic field is parallel to said measurement plane.

Preferably, the two waveguides are parallel with one another.

According to one variant, the first set consists of a single conductive wire (WIz) coincident with the axis of symmetry (Sy). Preferably, the conductive wires of the second set are not perpendicular to the single conductive wire of the first set.

According to another variant, the first set comprises a plurality of n conductive wires that are parallel with one another. Advantageously, an angle between the conductive wires of the first set and the conductive wires of the second set is between 30° and 60°. According to one embodiment of this variant, the first set furthermore comprises a conductive wire coincident with the axis of symmetry.

Preferably, the two waveguides and the conductive wires that are secant to said waveguides are respectively positioned on a first level and a second level that are separated by an insulator. Advantageously, all of the conductive wires of the first and of the second set are positioned on the second level.

According to another variant, the sensor according to the invention furthermore comprises a third set comprising a first and a second conductive wire that are positioned symmetrically about the axis of symmetry and in parallel with the first and with the second waveguides, respectively, and positioned on the first level.

Advantageously, each said waveguide is chosen from among a microstrip line, a coplanar line and preferably a coplanar line including three conductive wires that are parallel with one another and electrically insulated from the conductive wires of the first and of the second set, and of the third set where applicable.

Advantageously, the optical intensity detection system is designed to measure, at a single point on said path, at least one population of said ultra-cold atoms in one said internal state.

Advantageously, the optical intensity detection system includes at least one laser at least one wavelength of which corresponds to an absorption peak of the light intensity by said ultra-cold atoms in one said internal state.

Preferably, the difference between the length of said closed path taken by two said traps is less than the de Broglie length of said ultra-cold atoms, preferably less than 80% of the de Broglie length of said atoms and preferably less than 50% of the de Broglie length of said atoms.

The following description presents several variant embodiments of the device of the invention with regard to the topology of the conductive wires and of the microwave guides. These variants have both features that are essential to the invention and additional features that are linked to the embodiments under consideration. For the sake of clarity, the same elements will bear the same references in the various figures.

As outlined above, thermal ultra-cold atoms are understood to mean atoms that are ultra-cold but whose temperature is not low enough to observe atoms in a condensed state. Atoms are considered to be ultra-cold in the remainder of the description when their temperature is lower than 400 nanokelvin, preferably than 300 nanokelvin. In all of the embodiments of the invention, the atoms under consideration are thermal ultra-cold or condensed, and advantageously thermal ultra-cold. Advantageously, the temperature of thermal ultra-cold atoms is, for example for rubidium atoms, between 50 and 400 nanokelvin, and preferably between 100 and 300 nanokelvin.

BRIEF DESCRIPTION OF THE DRAWINGS

The invention will be better understood and other advantages, details and features thereof will emerge over the course of the following explanatory description, given by way of example with reference to the appended drawings, in which:

FIG. 4a illustrates an embodiment of the first variant of the invention, and FIG. 4b illustrates another preferred embodiment of the first variant.

FIGS. 13a-13b illustrate another embodiment of the invention, FIG. 13a illustrating this embodiment applied to the first variant for perpendicular wires of the second set, and FIG. 13b illustrating this embodiment applied to the first variant for non-perpendicular wires of the second set.

DETAILED DESCRIPTION

Figure 2:
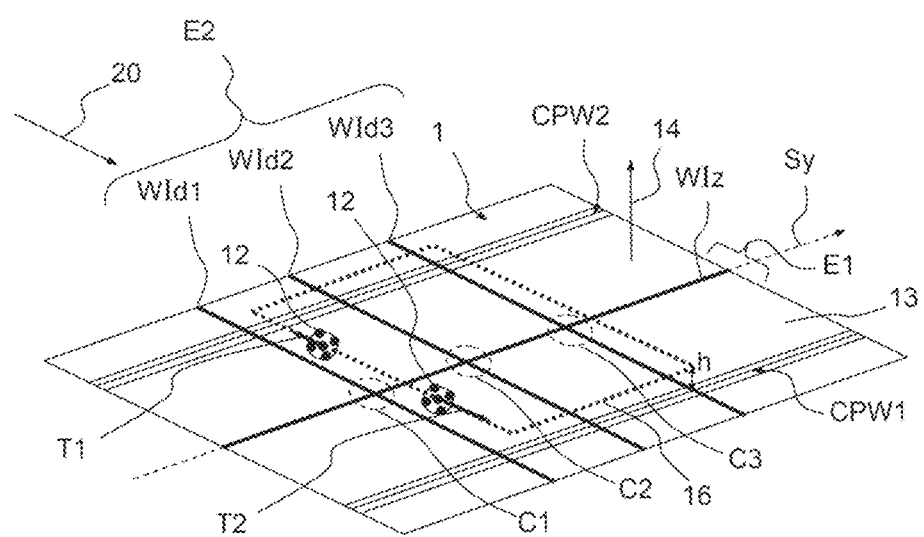
FIG. 2 schematically illustrates an ultra-cold atom chip according to a first variant of the invention, as well as the path of two atomic clouds.

FIG. 2 schematically illustrates an ultra-cold atom 12 chip 1 according to a first variant of the invention, as well as the path 16 of two atomic clouds according to this variant. Part of the surface of the chip 1 forms a measurement plane 13. An axis normal to the measurement plane 13 defines the measurement axis 14, along which a rotational measurement is carried out by the gyrometer.

The atom chip 1 is positioned in a vacuum chamber maintained under vacuum, for example, using an ion pump and preferably having magnetic shielding. The vacuum chamber includes an ultra-cold atom source. The ultra-cold atom source is defined by:

an atom dispenser, for example formed by a heating filament delivering a rubidium vapour;

a primary (optical and/or magnetic) atom trap, making it possible to pre-cool and to position a cloud of ultra-cold atoms in the vicinity of the chip, so as to load the magnetic traps T1 and T2 that are described later on with atoms.

The vacuum chamber also includes a magnetic field source, external to the chip 1. It makes it possible to impose a homogeneous and steady magnetic field 20 over a thickness at least of the order of h above the measurement plane 13. Advantageously, the direction of the homogeneous magnetic field is parallel to the measurement plane.

The chip 1 also comprises means designed to generate a first ultra-cold atom trap T1 and a second ultra-cold atom trap T2, one trap making it possible to immobilize a cloud of ultra-cold atoms 12 in an internal state different from the other trap, at a predetermined distance h from said measurement plane 13. For example, the trap T1 comprises the atoms in the state |a>, and the trap T2 comprises atoms in the state |b>.

These means comprise at least one first waveguide CPW1 and one second waveguide CPW2 that are designed to propagate microwaves at angular frequencies $\omega_a$ and $\omega_b$. The waveguides are non-secant and positioned symmetrically about an axis called the axis of symmetry Sy. The simplest, but nonlimiting, configuration is such that the two waveguides are parallel with one another, as illustrated in FIG. 2.

The means for generating the two traps also comprise conductive wires integrated into the chip 1 and designed to be flowed through by DC currents. The conductive wires are distributed into a first set E1 comprising at least one conductive wire and a second set E2 comprising a plurality of n conductive wires that are parallel with one another, n being at least equal to 2. In the example of FIG. 2 n=3, i.e. three conductive wires WId1, WId2 and WId3.

The conductive wires of the first set may be arranged in accordance with several variants. According to a first variant illustrated in FIG. 2, the first set consists of a single conductive wire WIz coincident with the axis of symmetry Sy. Other variants will be described later on. The two sets of wires are arranged so that at least one conductive wire of the first set is not parallel with the conductive wires WId1, WId2, WId3 of the second set, defining n points of intersection, in this case 3 points of intersection C1, C2, C3 between a conductive wire of the first set and a conductive wire of the second set. The arrangement is furthermore such that all of the points of intersection are located on the axis of symmetry Sy.

Each conductive wire is linked to one or more current and/or voltage generators, which generators are themselves linked to a processing unit including at least one microprocessor. The voltage and/or current generators make it possible to control both DC currents and AC currents in the wires. In particular, DC currents are controlled in the conductive wires.

According to one preferred embodiment, the wires of the first and of the second set are positioned on one and the same level, and at each point of intersection there is electrical contact between the conductive wire of the first set and the conductive wire of the second set that form the point of intersection. In this case, floating power supplies should be used so as to control the current in each of the wires. This embodiment is the simplest one to implement (just one metallization level common to the two sets).

According to another embodiment, the conductive wires of the first and of the second set are positioned on different levels that are separated by a layer of electrical insulator.

The two waveguides CPW1 and CPW2 are designed to propagate microwaves with angular frequencies $\omega_a$ and $\omega_b$, and connected to at least one microwave-frequency current or voltage generator.

According to one embodiment, each of the waveguides is produced by depositing three parallel conductive wires so as to produce a coplanar waveguide. In other embodiments of the invention, it is possible to use other types of waveguide, in particular waveguides whose manufacture is compatible with deposition or etching micro-manufacturing techniques. It is possible to produce a microstrip line, for example.

Furthermore, said means are configured to modify the energy of the ultra-cold atoms 12 so as:

to create a potential minimum for the ultra-cold atoms in the internal state |a> and a potential minimum for the ultra-cold atoms in the internal state |b>, thus forming the first ultra-cold atom trap T1 and the second ultra-cold atom trap T2;

and to move the traps T1 and T2 along a closed path 16 defining an area A, traveled in one direction by the ultra-cold atoms of the first trap and in the opposite direction by the ultra-cold atoms of the second trap.

In FIG. 2, the path 16 in dashed lines illustrates the path of the clouds of ultra-cold atoms 12. This closed path defines an area denoted A. A distance h separates the plane of the path 16 and the measurement plane 13 of the chip. Preferably, h is between 500 nm and 1 mm, and preferably between 5 μm and 500 μm.

The specific arrangement of the conductive wires and of the waveguides, associated with the homogeneous magnetic field source, easily makes it possible to obtain two traps T1 and T2 having a value of the minimum V0 that is non-zero and identical, and an identical curvature, which condition is necessary for the sensor to operate, as explained above. Specifically, as explained further on, when a DC current is applied to at least two conductive wires of a point of intersection, the potential minimum is located at the vertical of this point of intersection. When a microwave power is then sent into the waveguides, the central minimum transforms into two minima on either side of the initial minimum in the direction of the waveguides. If the initial minimum is not situated strictly at an equal distance from the two waveguides, the two potential minima that are created will not have precisely the same value of the minimum V0 and the same curvature.

Figure 3A:
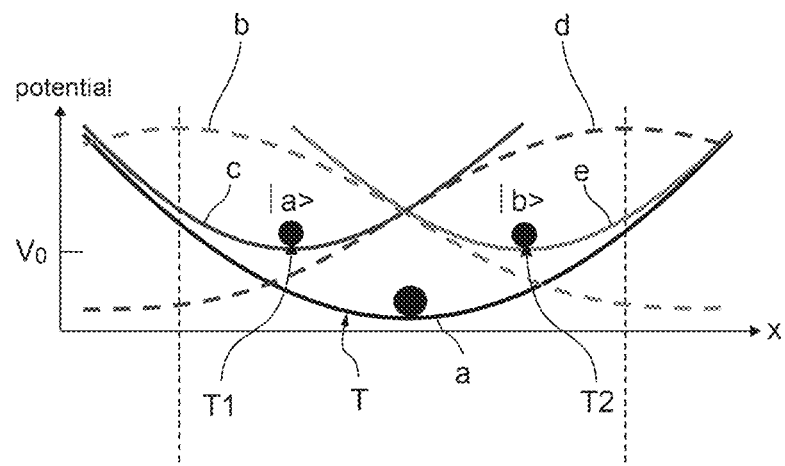
FIGS. 3a-3c schematically illustrate the respective potentials of the two atom traps (FIG. 3a), and the corresponding layout of the conductive wires/waveguide that are printed on a chip, in a profile view (FIG. 3b) and in a plan view (FIG. 3c), according to the first variant of the invention.
Figure 3B:
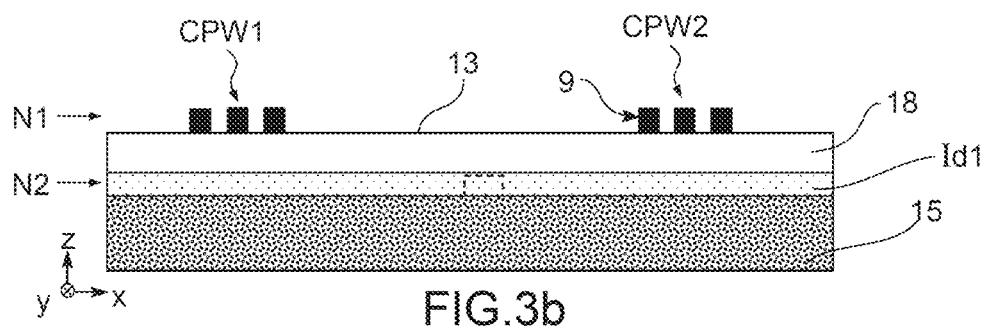
Figure 3C:
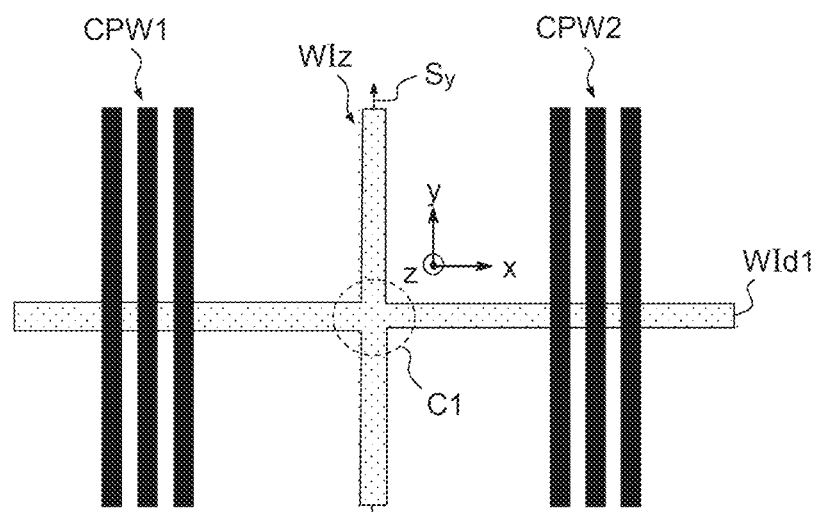

FIGS. 3a-3b schematically illustrate the respective positions of the various minima according to an example of the first variant of the invention, in the vicinity of the initial point of intersection C1. FIG. 3a illustrates the respective potentials of the two atom traps. FIG. 3b describes the corresponding layout of the conductive wires and of the waveguides that are printed on a chip in a profile view, in cross section along the conductive wire WId1 of the second set E2, which crosses the single conductive wire WIz along the axis of symmetry Sy, and FIG. 3c describes the plan view.

Figure 1:
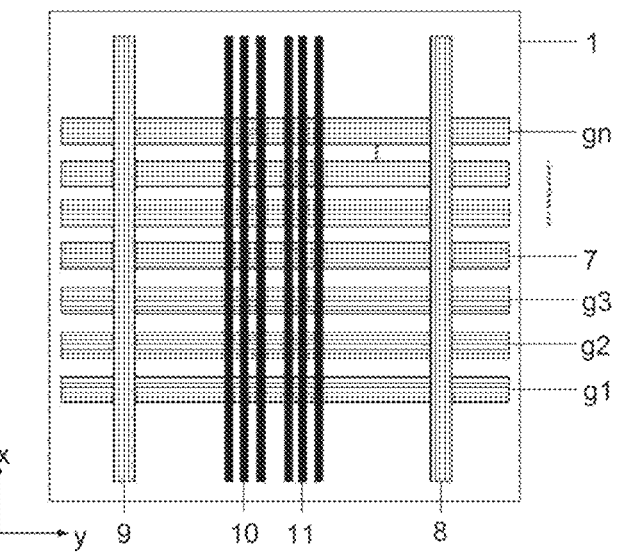
FIG. 1 illustrates the wire/microwave waveguide topology of an ultra-cold atom sensor according to the prior art.

According to this first variant, the first set comprises a single conductive wire WIz flowed through by a DC current Iz. The second set comprises n conductive wires that are parallel with one another, just one of which is shown in FIGS. 3a-3b. The use of a single central wire WIz makes it possible not to have to balance the electric currents between two wires, such as described in FIG. 1 from the prior art (wires 8 and 9).

In the embodiment of the invention illustrated in FIG. 2, two waveguides CPW1 and CPW2 are printed on the chip. These guides do not intersect one another and are positioned symmetrically about Sy. Advantageously, the two waveguides are parallel with one another; this is the simplest configuration to implement. Advantageously, the waveguides are coplanar waveguides situated on a first level N1. Each of the coplanar waveguides CPW1 and CPW2 (acronym for coplanar waveguide) is formed by 3 conductive wires that are parallel with one another and electrically insulated from the conductive wires of the first and of the second set.

The conductive wires that are secant to the waveguides are mandatorily positioned on a level different from that of the waveguides in order to prevent any electrical contact between wires and waveguide. Preferably, the conductive wires that are secant to the waveguides are positioned on a second level N2 that is separated from the first level by a layer of an electrical insulator 18. Preferably, all of the conductive wires of the first and of the second set are positioned on the second level N2; this is the simplest configuration to manufacture.

The layer 18 advantageously makes it possible to flatten the measurement plane 13. The material of the layer of electrical insulator may be for example silicon dioxide, silicon nitride or benzocyclobutene.

A conductive material is used to manufacture the conductive wires of the first and of the second set, for example gold, and is deposited on a substrate 15. In embodiments of the invention, the substrate may be made for example of silicon, of aluminum nitride or of silicon carbide.

FIG. 3a illustrates the symmetrical separation of ultra-cold atoms, specific to the internal state of said ultra-cold atoms. More precisely, FIG. 3a illustrates the variations in potential as a function of the axis x of the chip 1. The curve 'a' in black shows a potential well corresponding to the combination of the homogeneous magnetic field and of the field created by two secant conductive wires, one wire WIz of the first set flowed through by the current $I_z$ and the other wire WId1 of the second set flowed through by the current Id1. This results in a local potential well forming an atom trap T in three dimensions. A cloud of ultra-cold atoms is able to be trapped and cooled there.

The curve 'b' in light gray dashed lines schematically shows the potential created by the transmission of microwaves at the frequency $\omega_b$ in the waveguide CPW1. The field emitted by the passage of microwaves at the frequency $\omega_b$ makes it possible to modify the energy of the ultra-cold atoms and to move the atoms with internal states |b>. In this embodiment of the invention, the frequency $\omega_b$ is chosen so as to advantageously impose a repulsive field on the internal states |b> of the ultra-cold atoms 12. In another embodiment of the invention, it is possible to impose an attractive field on the internal states |b> by imposing a frequency $\omega_{b'}$ different from $\omega_b$. This method for separating ultra-cold atoms that is specific to the internal state of said atoms is described by Ammar et al. (Ammar, M., Dupont-Nivet, M., Huet, L., Pocholle, J. P., Rosenbusch, P., Bouchoule, I., etc. & Schwartz, S., 2015, Symmetric micro-wave potentials for interferometry with thermal atoms on a chip. PHYSICAL REVIEW A 91, 053623), in the case of the implementation of a thermal ultra-cold atom interferometry unidirectional accelerometer.

The curve 'e' in a light gray unbroken line illustrates the potential seen by the internal states |b> due to the contributions of the potentials illustrated by the curve 'a' and by the curve 'b'. The curve 'e' exhibits a local potential minimum that makes it possible to locally trap a cloud of ultra-cold atoms with internal states |b>.

Similarly, the curve 'd' in dark gray dashed lines schematically shows the potential created by the transmission of microwaves at the frequency $\omega_a$ in the waveguide CPW2. The field emitted by the passage of microwaves at the frequency $\omega_a$ makes it possible to modify the energy of the ultra-cold atoms and to move the atoms with internal states |a>. In this embodiment of the invention, the frequency $\omega_a$ is chosen so as to advantageously impose a repulsive field on the atoms with internal states |a> of the ultra-cold atoms 12. In another embodiment of the invention, it is possible to impose an attractive field on the atoms with internal states |a> by imposing a frequency $\omega_{a'}$ different from $\omega_a$.

The curve 'c' in a dark gray unbroken line illustrates the potential seen by the atoms with internal states |a> due to the contributions of the potentials illustrated by the curve 'a' and by the curve 'd'. The curve 'c' exhibits a local energy minimum that makes it possible to locally trap a cloud of ultra-cold atoms with internal states |a>.

In one embodiment of the invention, the clouds of ultra-cold atoms with internal states |a> and |b> may be separated and trapped symmetrically about the axis of symmetry Sy by simultaneously imposing the propagation of waves of frequency $\omega_a$ in CPW2 and $\omega_b$ in CPW1. To obtain two traps whose minima have the same value V0 and whose curvatures have the same value, it is vital for the point of intersection C1 to be positioned at an equal distance from CPW1 and CPW2, on the axis of symmetry Sy.

In FIG. 3a, according to one embodiment, the wire WId1 of the second set is perpendicular to the wire WIz of the first set. This embodiment is also illustrated in FIG. 4a, where n=3 wires WId1, WId2, WId3 of the second set flowed through by currents $I_{d1}$, $I_{d2}$ and $I_{d3}$, respectively.

According to another preferred embodiment illustrated in FIG. 4b, the wires of the second set are not perpendicular to the wire(s) of the first set. This embodiment is preferred as, with this geometry, the DC magnetic part of the two traps that are generated forms a trap known in the literature under the name 'dimple' and whose own axes may be oriented parallel or perpendicular to the axis of symmetry Sy. This type of trap is known to be sufficiently confining to:

enable effective cooling of the atoms enable compliance with the adiabatic development conditions, i.e. the traps are able to move quickly, that is to say in a time shorter than the coherence time of the atom source.

It is well known that 'dimple' traps have a minimum with a non-zero magnetic field. This has the effect of eliminating what are termed Majorana losses, thus enabling effective cooling, and of creating coherent superposition between the two states of the interferometer.

Document CN102927978 does not disclose such advantages. So as not to have a term in the phase that stems from a difference in energy of the minimum of the two traps for the two internal states, the currents in the two wires 9 and 8 have to be exactly equal.

The DC magnetic part of the trap used in CN102927978, which is created using wires 9-8-gi (where i is between 1 and n), confines very poorly along the y-axis. This results in the following problems:

the cooling of the atoms in this trap is ineffective.

to comply with the adiabatic development conditions for the movement of the traps, the two traps have to be separated very slowly. Typically, this time will be longer than the coherence time of the atom source that is used, whether or not the latter is condensed. It is therefore not possible to carry out a measurement.

Furthermore, the DC magnetic part of the trap used in CN102927978 exhibits a magnetic field zero at its minimum. This results in two consequences for the operation of the described chip:

very high atomic losses during the cooling phase (Majorana effect).

as the two states of the interferometer are two Zeeman sub-levels and, at a magnetic field zero, all of the Zeeman levels are degenerate, it is impossible to achieve an acceptable coherent superposition between the two states of the interferometer and therefore to initialize the sensor.

Figure 5A:
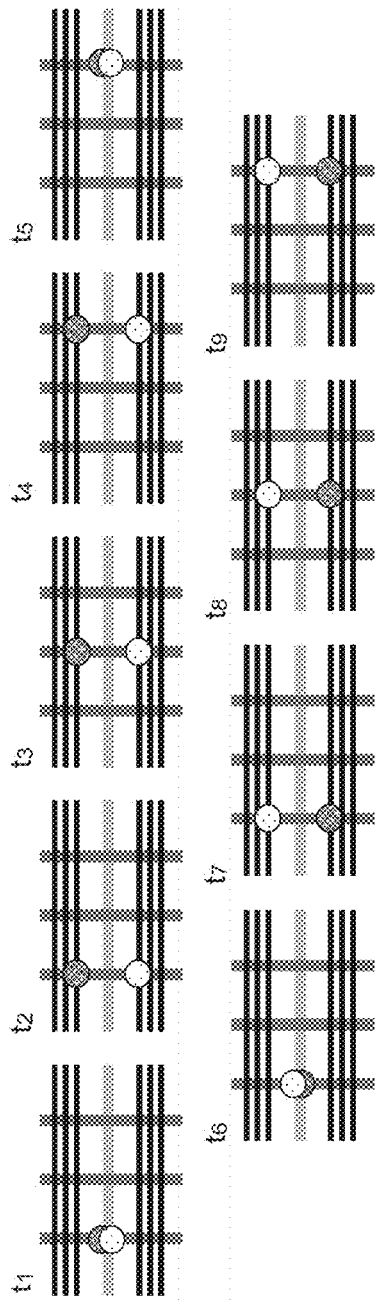
FIGS. 5a and 5b schematically show a sequence of the movement of each of the clouds of ultra-cold atoms for the first variant of the invention, FIG. 5a for one embodiment and FIG. 5b for another embodiment of the invention.
Figure 5B:
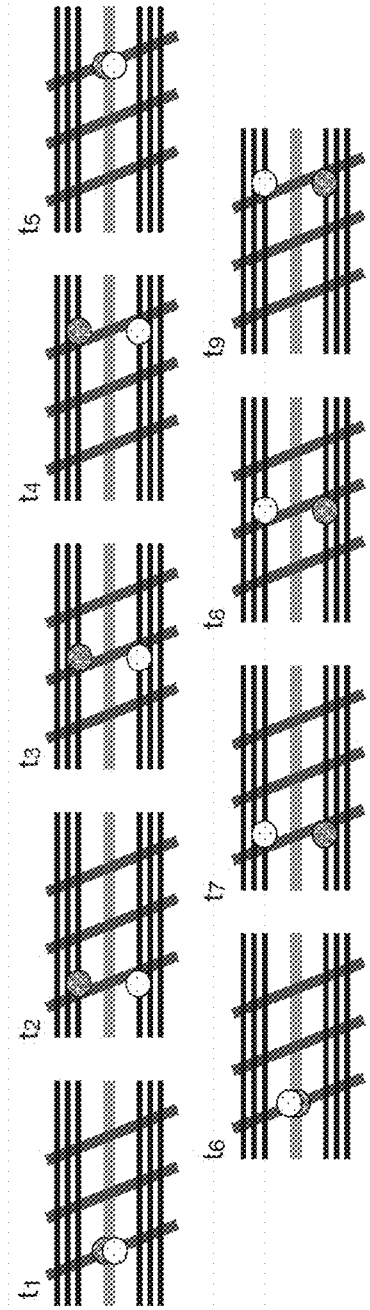
Figure 6:
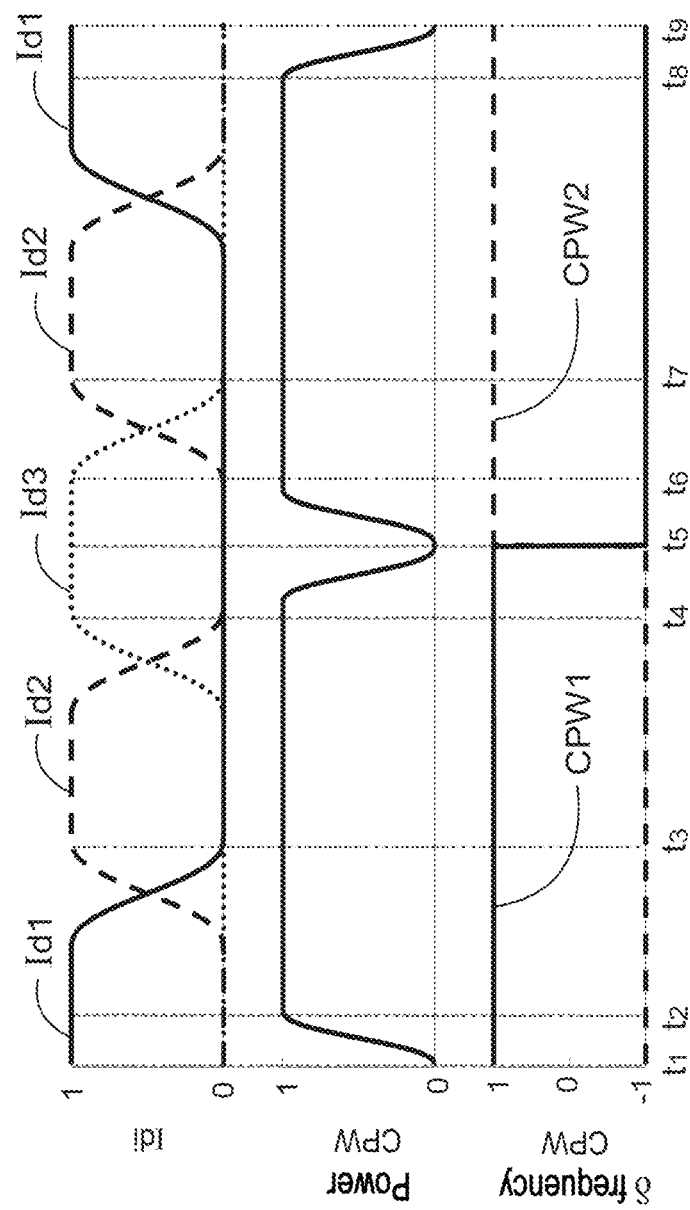
FIG. 6 illustrates a sequence of the various currents applied to conductive wires, the powers applied to the waveguides and the frequencies applied to the waveguides of the chip, according to the first variant of the invention.

FIGS. 5a-5b schematically show a sequence of the movement of each of the clouds of ultra-cold atoms according to the first variant of the invention. FIG. 5a corresponds to the embodiment in which the conductive wires of the second set are perpendicular to the single wire of the first set, and FIG. 5b corresponds to the preferred non-perpendicular embodiment. Each diagram corresponds to a characteristic time of the sequence, denoted $t_1$ to $t_9$. FIG. 6 illustrates, in a complementary manner, a sequence of the various currents applied to the conductive wires, the powers applied to the waveguides and the frequencies imposed on the waveguides, according to the first variant of the invention (identical for both embodiments). This sequence is illustrated in FIG. 6 for the times corresponding to those of FIGS. 5a-5b, denoted $t_1$ to $t_9$.

In the sequence shown in FIGS. 5a-5b and 6, the current Iz, not shown, is steady, at a constant value. In addition, the sequence described in FIGS. 5 and 6 may advantageously be repeated periodically. The various angular frequencies of the waveguides may be applied periodically, and the various potentials at the terminals of the conductive wires may be applied periodically. In FIG. 6, the values of the currents, of the powers and of the frequencies are arbitrary. The ordinate δ frequency corresponds to a frequency variation expressed in arbitrary units, around an average value of the frequency. In embodiments of the invention, the currents flowing through the conductive wires may be between 100 µA and 10 A, and the angular frequencies injected into the waveguides may be between 6.6 GHz and 7 GHz if rubidium atoms are used.

At $t_1$, the currents $I_z$ and $I_d$ are imposed on the conductive wires WIdz and WId1, respectively. The two internal states |a> and |b> and spatially superposed. The cloud of atoms with internal states |a> is symbolized by a light-textured disk, and the cloud of atoms with internal states |b> is symbolized by a darker-textured disk.

To obtain a cloud of ultra-cold atoms having the two superposed internal states such as depicted schematically at $t_1$, a cloud of ultra-cold atoms is generated beforehand in the chamber. Atoms may first of all be freed by 'dispensing' them, and then trapped and pre-cooled by the primary atom trap. The cloud of ultra-cold atoms 12 may then be loaded into the initial trap T at the position described at $t_1$. The initial trap, in this step, is located at a distance h from the measurement plane 13, and in a projection onto the measurement plane, at the intersection of the first wires potentially flowed through by the currents $I_Z$ and $I_{d1}$. The height h is other than 0 (as the homogeneous magnetic field 20 is non-zero) and may vary during the travel of a trap on the chip. As disclosed in detail by Tannoudji, C. C, the internal state of the atoms may be initialized by a first electromagnetic pulse, enabling a single internal state to be imposed on all of the ultra-cold atoms (called Zeeman sub-level). This initialization may be carried out using laser beams or using a microwave emission.

A second pulse is then applied to the cloud of atoms, called pulse π/2: said second pulse makes it possible to obtain a cloud of atoms having a coherent superposition of internal states |a> and |b>. This pulse may be produced using a laser, a microwave emission, or more generally using a method emitting waves at a suitable transition frequency.

Between $t_1$ and $t_2$, the microwave power injected into the waveguides CPW1 and CPW2 changes gradually from 0 to its maximum value. An angular frequency $\omega_a$ is sent into the waveguide CPW1 and an angular frequency $\omega_b$ is sent into the waveguide CPW2, thereby making it possible to separate the two clouds with different internal states onto either side of the axis of symmetry 19, to the positions depicted schematically in $t_2$. The ultra-cold atom trap T described above at the instant $t_1$ is then transformed into two ultra-cold atom traps T1 and T2, each trap making it possible to immobilize a cloud of ultra-cold atoms with internal states different from the other trap (in this case with internal states |a> in one of the traps, for example T1, and with internal states |b> in the other trap T2, as described in FIG. 3a).

Between $t_2$ and $t_3$, the current $I_{d1}$ is gradually cut off and $I_{d2}$ is gradually brought to its maximum value (the time interval separating $t_2$ and $t_3$ is typically of the order of 10 ms and may be between 0.1 ms and 100 ms): the two traps T1 and T2 are moved to the right to the positions depicted schematically in $t_3$.

Between $t_3$ and $t_4$, the current $I_{d2}$ is gradually cut off and $I_{d3}$ is gradually brought to its maximum value: the two traps are moved to the right to the positions depicted schematically in $t_4$. In other embodiments of the invention, this operation may be repeated several times with further conductive wires in the second set so as to increase the area contained in the path 16.

Between $t_4$ and $t_5$, the microwave power is gradually cut off: the two traps are brought to the same location on the chip, outlined schematically in $t_5$.

At $t_5$, the angular frequencies of the two microwave guides are modified: the angular frequency $\omega_b$ is imposed in CPW1 and the angular frequency $\omega_a$ is imposed in CPW2.

Between $t_5$ and $t_6$, the power in the two waveguides changes gradually from 0 to its maximum value: the traps are separated in the vertical direction, as depicted schematically in figure $t_6$.

Between $t_6$ and $t_7$, the current $I_{d3}$ is gradually cut off and $I_{d2}$ is gradually brought to its maximum value: the two traps T1 and T2 are moved to the left to the positions depicted schematically in $t_7$.

Between $t_7$ and $t_8$, the current $I_{d2}$ is gradually cut off and $I_{d1}$ is gradually brought to its maximum value: the two traps are moved to the left to the positions depicted schematically in $t_8$. In other embodiments of the invention, this operation may be repeated several times with further conductive wires so as to increase the area contained in the path 16.

Between $t_8$ and $t_9$, the microwave power in the waveguides is gradually cut off. The two traps T1 and T2 move vertically until merging into a single trap situated at the starting point depicted schematically in $t_1$.

That is to say, for the n wires of the second set indexed i WIdi, DC currents are therefore applied to the two wires corresponding to the initial point of intersection C1, and over time these currents are applied successively to the various points of intersection Ci situated on the axis of symmetry, while simultaneously applying a microwave power to the waveguides. The two traps T1 and T2 therefore move in the direction of 'activation' of the points of intersection: from the point of intersection Ci to the point of intersection Cn. In the embodiments shown in FIG. 4, a point of intersection Ci consists of the pair (Wdz, WIdi). The return is made by reversing the microwave frequencies and by activating the DC currents successively in the wires corresponding to the various points of intersection by going through them from Cn to C1.

The traps are thus made to travel the closed path 16 described above, and then the Sagnac phase is measured. In different embodiments of the invention, the traps may be made to travel this path N times before measuring the Sagnac phase, and a phase that will potentially be higher may thus be measured.

In order to keep a coherence that enables interferential measurement, the difference between the length of the total paths traveled by the ultra-cold atoms |a> and the ultra-cold atoms |b> has to be less than the de Broglie length of the ultra-cold atoms. Advantageously, this difference may be less than 80% of the de Broglie length of the ultra-cold atoms and preferably less than 50% of the de Broglie length of the ultra-cold atoms.

The higher the number N of trips, the more difficult it is to comply with this condition. Specifically, in this case, the equalization between the curvatures of the potential minima of the traps T1 and T2 has to be N times better in order to guarantee a coherence time of the atom source that is used that is greater than the duration of the measurement.

A second pulse π/2 is then produced. When all of the sources of phase shift other than the Sagnac effect are eliminated or made common for both internal states |a> and |b>, the resulting internal state for the ultra-cold atoms is then given by:

$$\frac{1}{2}[(1-e^{-i\theta})|a> -i(1+e^{-i\theta})|b>].$$

To measure the Sagnac phase, the two populations of atoms with internal states |a> and |b> are measured at a point, for example the starting point of the sequence described in FIGS. 5a-5b. This measurement may be performed for example by laser absorption while sampling the resonance between the angular frequency specific to an internal state and that of the laser.

Measuring the populations of atoms in each of the states |a> and |b> makes it possible, considering equation 1, to determine the Sagnac phase in accordance with, for example, for the internal state |a>:

$$P(|a>)=(1+\cos(\theta))/2 \qquad (2)$$

This method, using the measurement of at least one population of atoms in a specific internal state at a point on the path, makes it possible to solve a technical problem of the prior art. Advantageously, two populations of atoms with different internal states are measured. Implementing the invention considerably simplifies this measurement, which may be carried out just using one or more photodiodes suitable for measuring the absorption of a laser beam at a given location on the path. It is thus possible to deduce the rotational velocity of the chip 1.

The ultra-cold atoms of the embodiments of the invention are advantageously thermal ultra-cold atoms. Using thermal ultra-cold atoms, i.e. atoms that are not condensed, makes it possible to reduce a non-linear dependency, in the case of using condensed atoms, between the Sagnac phase and the population of atoms having a given internal state.

The sequences of FIGS. 5a-5b and of FIG. 6 detail the performance of one path trip for each of the two traps. Advantageously, several path trips may be made by the two traps before the measurement of atomic population corresponding to each internal state. Increasing the number of trips may make it possible to amplify the Sangac phase and to facilitate measurement thereof. This method may make it possible to measure the Sagnac phase with a device of limited size, smaller than that of the prior art.

Using traps T1 and T2 to transport the clouds of ultra-cold atoms makes it possible to solve a problem of the prior art using circular waveguides: using traps enables the ultra-cold atoms to propagate independently of the surface roughness, which roughness may cause reflections if waveguides are used.

Figure 7:
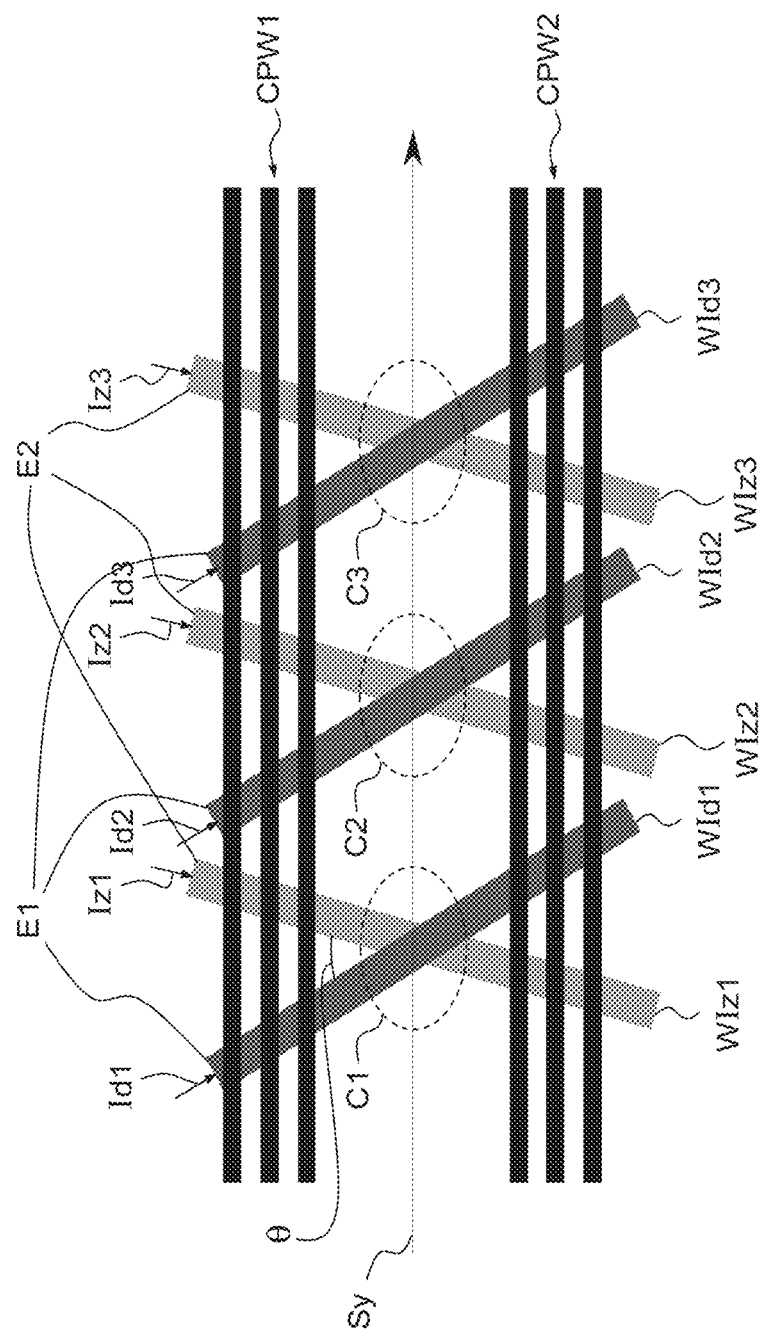
FIG. 7 illustrates an embodiment of the second variant according to the invention, FIG. 8 schematically shows a sequence of the movement of each of the clouds of ultra-cold atoms for this second variant of the invention.
Figure 8:
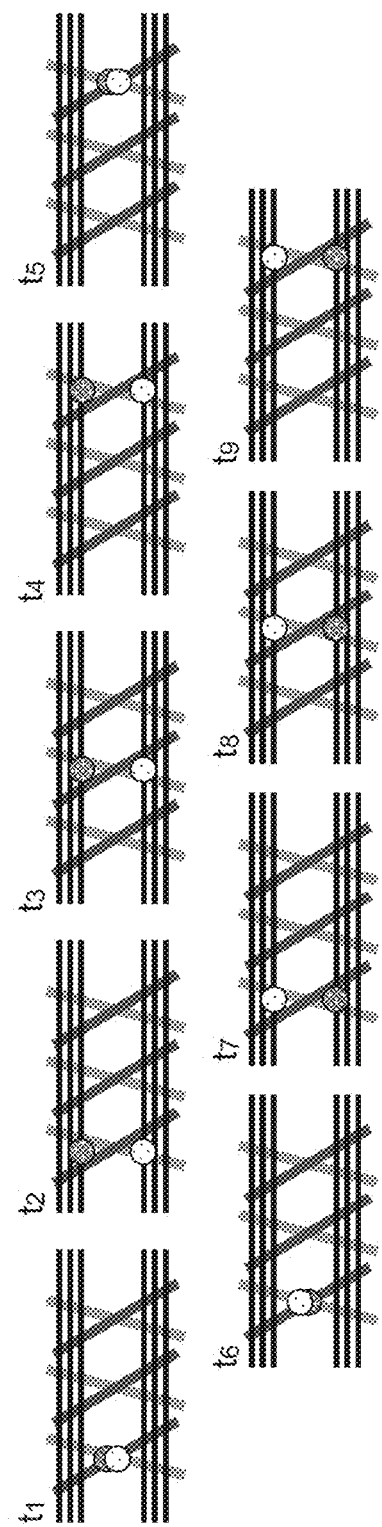
Figure 9:
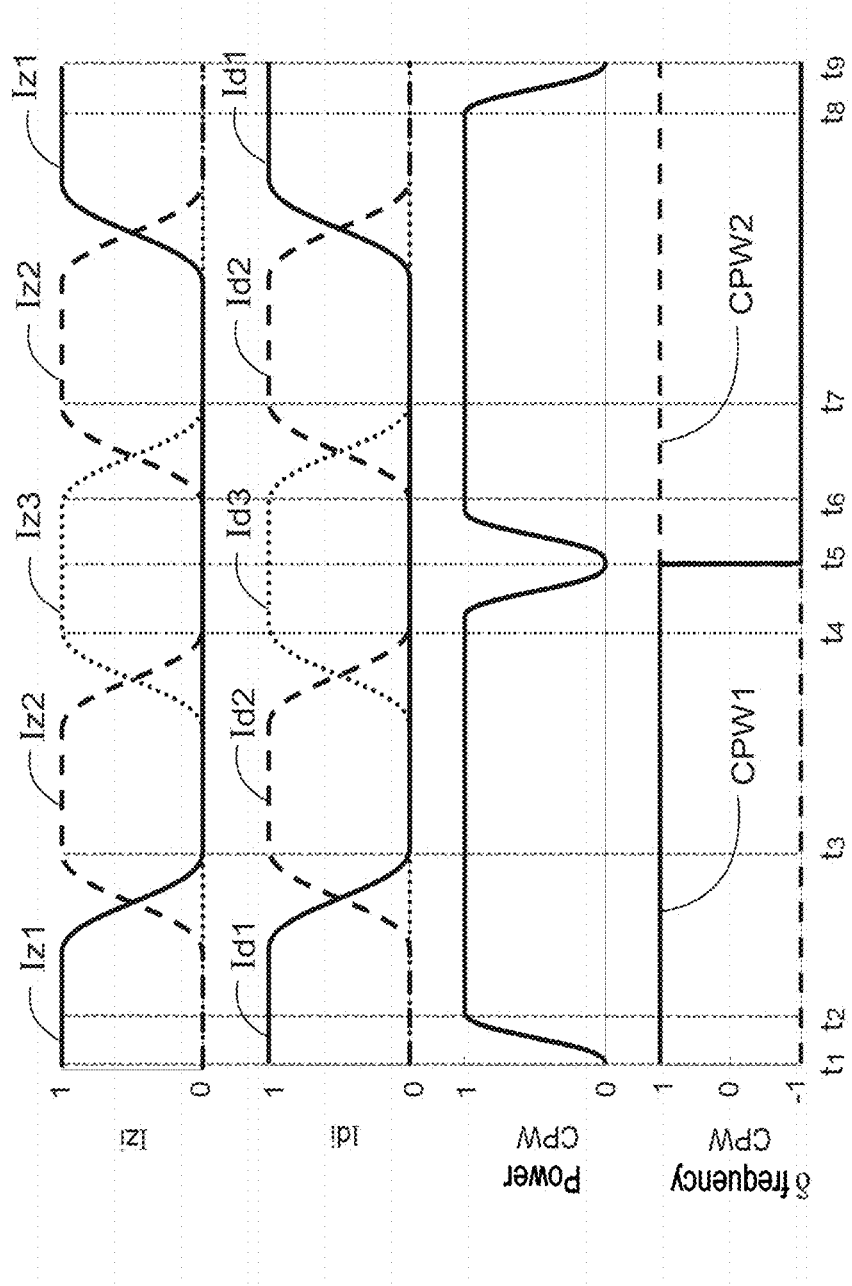
FIG. 9 illustrates a sequence of the various currents applied to the conductive wires, the powers applied to the waveguides and the frequencies applied to the waveguides of the chip, according to the second variant of the invention.

According to a second variant of the invention illustrated in FIG. 7, the first set E1 comprises a plurality of n (in this case n=3) conductive wires WIz1, WIz2, WIz3 that are parallel with one another, able to be flowed through by 3 DC currents Iz1, Iz2, Iz3, respectively. FIG. 8 schematically shows a sequence of the movement of each of the clouds of ultra-cold atoms for this second variant of the invention, in the same way as in FIGS. 5a-5b (first variant), and FIG. 9 illustrates a sequence of the various currents applied to the conductive wires, the powers applied to the waveguides and the frequencies applied to the waveguides of the chip, according to the second variant of the invention, in the same way as in FIG. 6 (first variant).

In the same way as previously, DC currents are applied to the two wires corresponding to the initial point of intersection, and over time these currents are successively applied to the various points of intersection situated on the axis of symmetry, while simultaneously applying a microwave power to the waveguides, and the two traps T1 and T2 move in the direction of 'activation' of the points of intersection. The return is made by reversing the microwave frequencies and by activating the DC currents successively in the wires corresponding to the various points of intersection by going through them from Cn to C1. i, ranging from 1 to n, indicates the points of intersection Ci In this case, a point of intersection Ci is associated with a pair of wires (WIzi, WIdi), which are therefore 'activated' together. The return is made by reversing the microwave frequencies and by activating the DC currents successively in the wires corresponding to the various points of intersection by going through them from Cn to C1.

This variant of the invention makes it possible to have an additional degree of freedom (wires WIzi) in comparison with the first variant of the invention shown in FIG. 4. It makes it possible to more easily equalize the curvatures and the levels of the potential minima of the two ultra-cold atom traps T1 and T2 and to adjust the axes of the two traps T1 and T2.

Preferably, an angle Θ between the conductive wires of the first set E1 and the conductive wires of the second set E2 is between 30° and 60°. This angular range makes it possible both to get sufficiently close to the points of intersection and to produce traps that are sufficiently confining.

Figure 10:
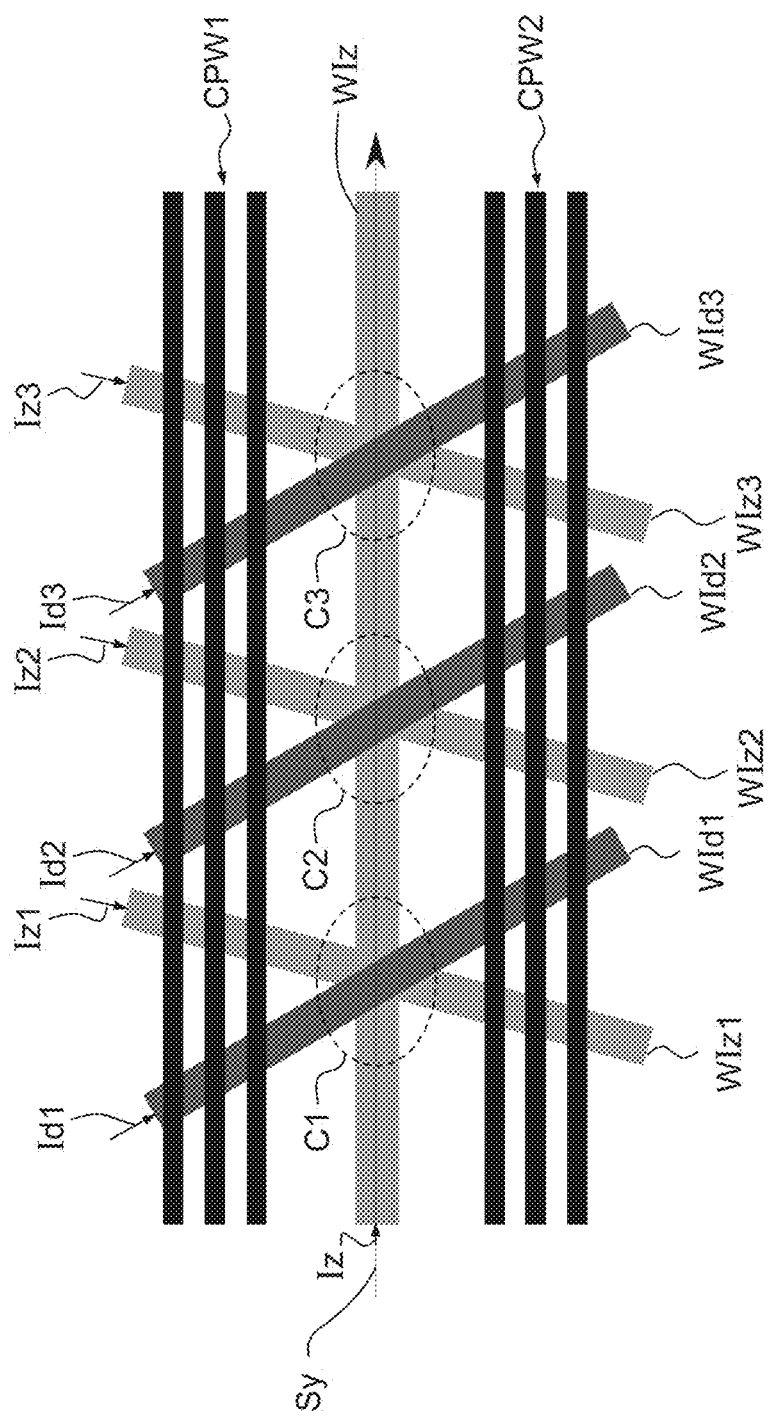
FIG. 10 illustrates a third variant of the invention.
Figure 11:
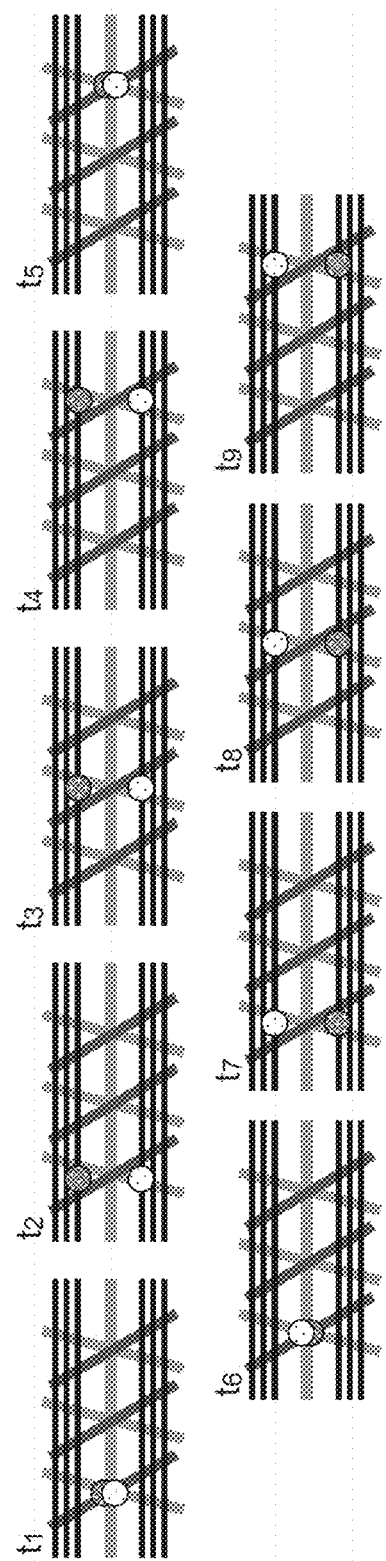
FIG. 11 schematically shows a sequence of the movement of each of the clouds of ultra-cold atoms for this third variant of the invention.
Figure 12:
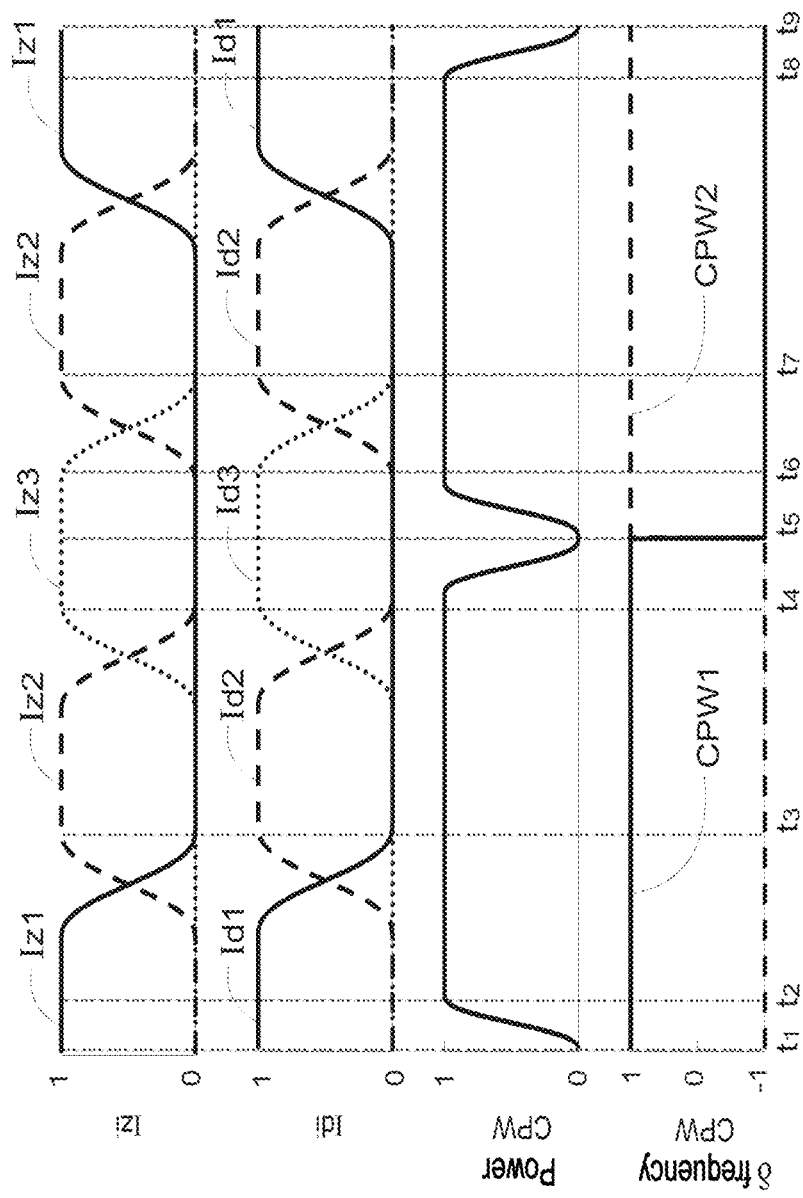
FIG. 12 illustrates a sequence of the various currents applied to the conductive wires, the powers applied to the waveguides and the frequencies applied to the waveguides of the chip, according to the third variant of the invention.

According to a third variant of the invention illustrated in FIG. 10, the first set E1 comprises a plurality of n (in this case n=3) conductive wires WIz1, WIz2, WIz3 that are parallel with one another, able to be flowed through by 3 DC currents Iz1, Iz2, Iz3, respectively, and a conductive wire WIz coincident with the axis of symmetry Sy. FIG. 11 schematically shows a sequence of the movement of each of the clouds of ultra-cold atoms for this third variant of the invention, identical to the movement of FIG. 8. FIG. 12 illustrates a sequence of the various currents applied to the conductive wires, the powers applied to the waveguides and the frequencies applied to the waveguides of the chip, according to the third variant of the invention. The currents are identical to those applied for the second variant, with, in addition, a current Iz with a constant value applied continuously to WIz. A point of intersection Ci is in this case associated with a triplet (WIz, WIzi, WIdi).

This configuration has the advantage of providing an additional degree of freedom for applying the correct potential to the point of intersection. It combines the advantages of the second variant shown in FIG. 7 with independent adjustment of the value of the magnetic field minimum of the two traps T1 and T2.

According to another embodiment of the invention, the means designed to generate a first and a second ultra-cold atom trap furthermore comprise a third set E3 of conductive wires comprising a first conductive wire WIm1 and a second conductive wire WIm2 that are positioned symmetrically about the axis of symmetry Sy and in parallel with the first waveguide CPW1 and with the second waveguide CPW2, respectively, the wires WIm1 and WIm2 being positioned on the same level as the waveguides, i.e. the first level N1.

This embodiment is compatible with all of the variants described above.

Figure 16:
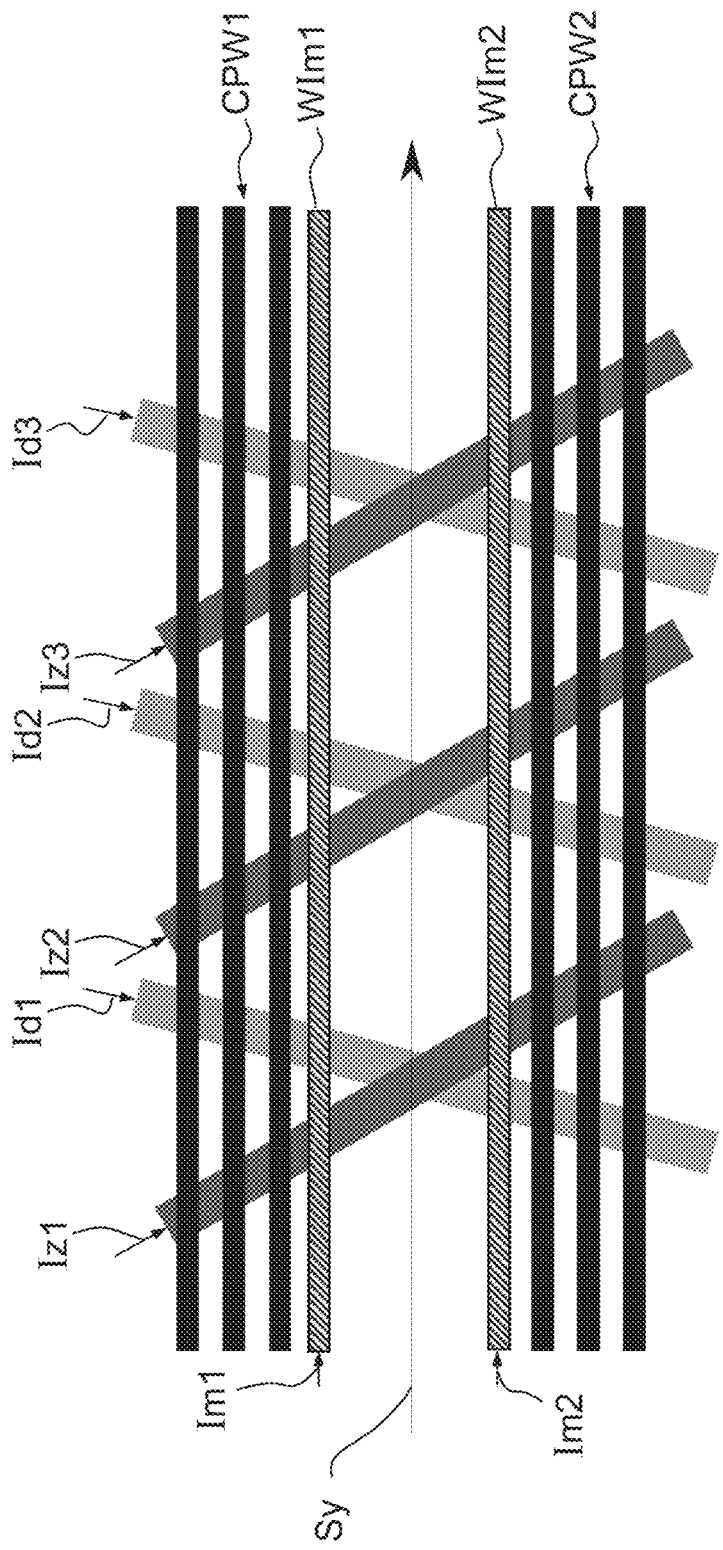
FIG. 16 illustrates this other embodiment of the invention, applied to the second variant.
Figure 19:
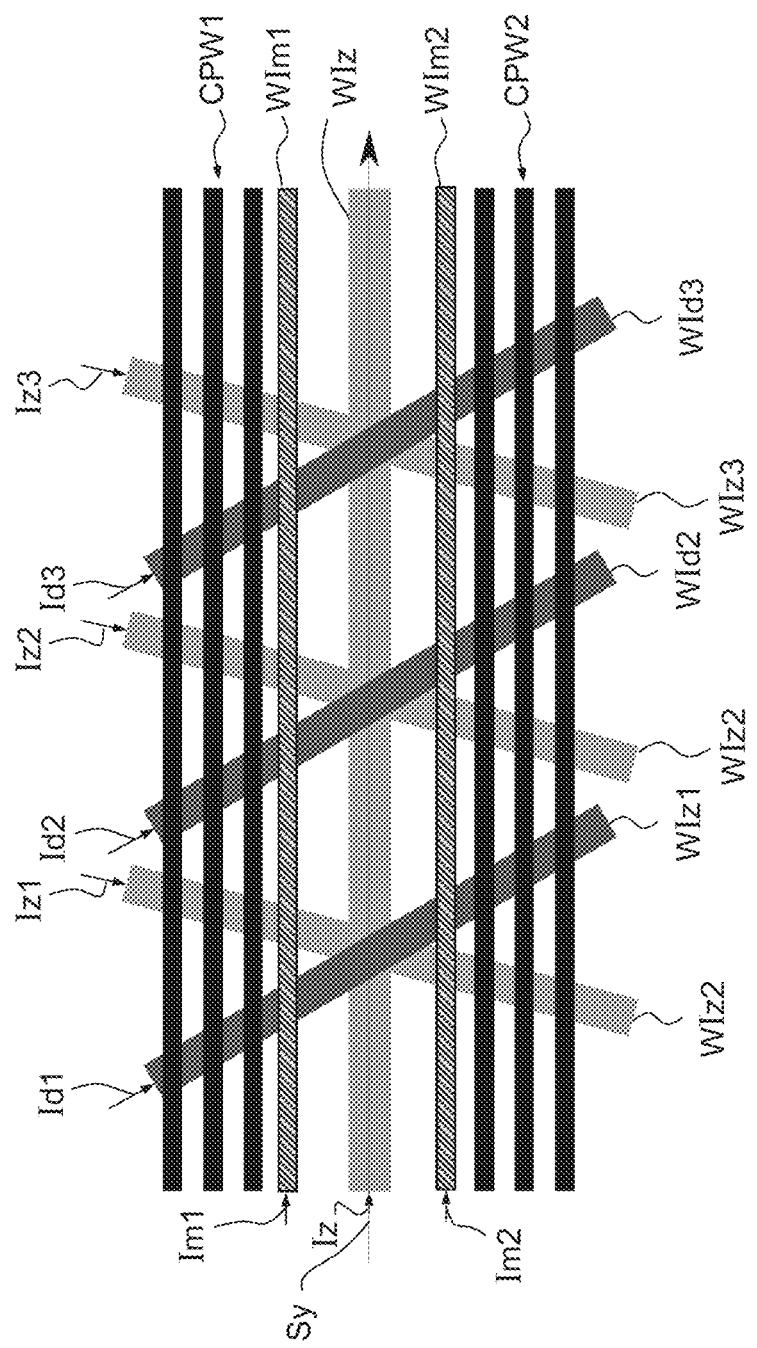
FIG. 19 illustrates this other embodiment of two additional wires that are coplanar with the waveguides, applied to the third variant of the invention.

It is compatible with the first variant, as illustrated in FIGS. 13a-13b, FIG. 13a for wires of the second set that are perpendicular to the first set of wires, and FIG. 13b for wires of the second set that are not perpendicular to the first set of wires. It is also compatible with the second variant as illustrated in FIG. 16 and with the third variant, as illustrated in FIG. 19.

Figure 14A:
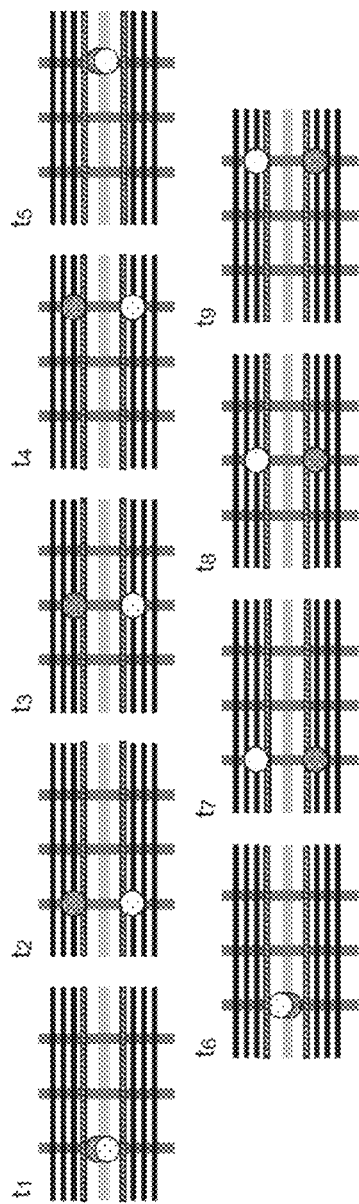
FIGS. 14a-14b schematically show a sequence of the movement of each of the clouds of atoms for this embodiment applied to the first variant.
Figure 14B:
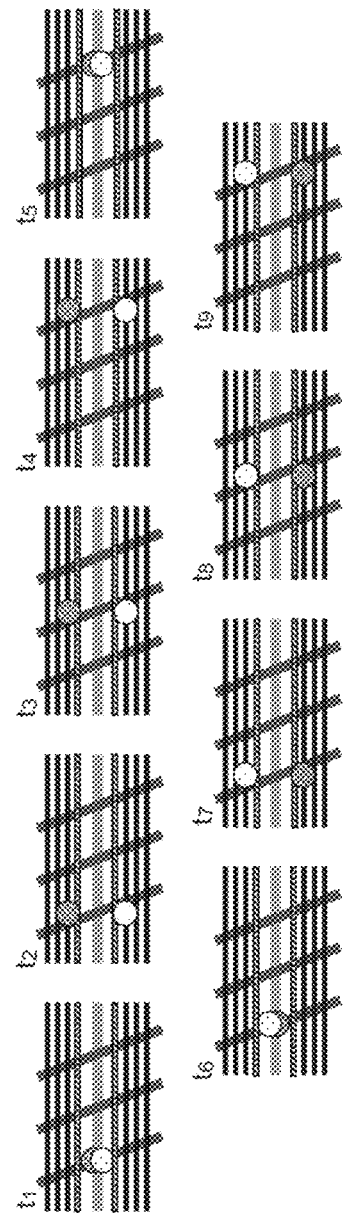

FIGS. 14a-14b schematically show a sequence of the movement of each of the clouds of ultra-cold atoms for this embodiment applied to the first variant of the invention, FIG. 14a corresponding to the variant of FIG. 13a and FIG. 14b to the variant of FIG. 13b. These movements take place in a similar way to those described in FIGS. 5a and 5b, but with a different sequence of DC currents and microwave powers.

A DC current $I_Z$ with a constant value is always applied to WIz.

Figure 15:
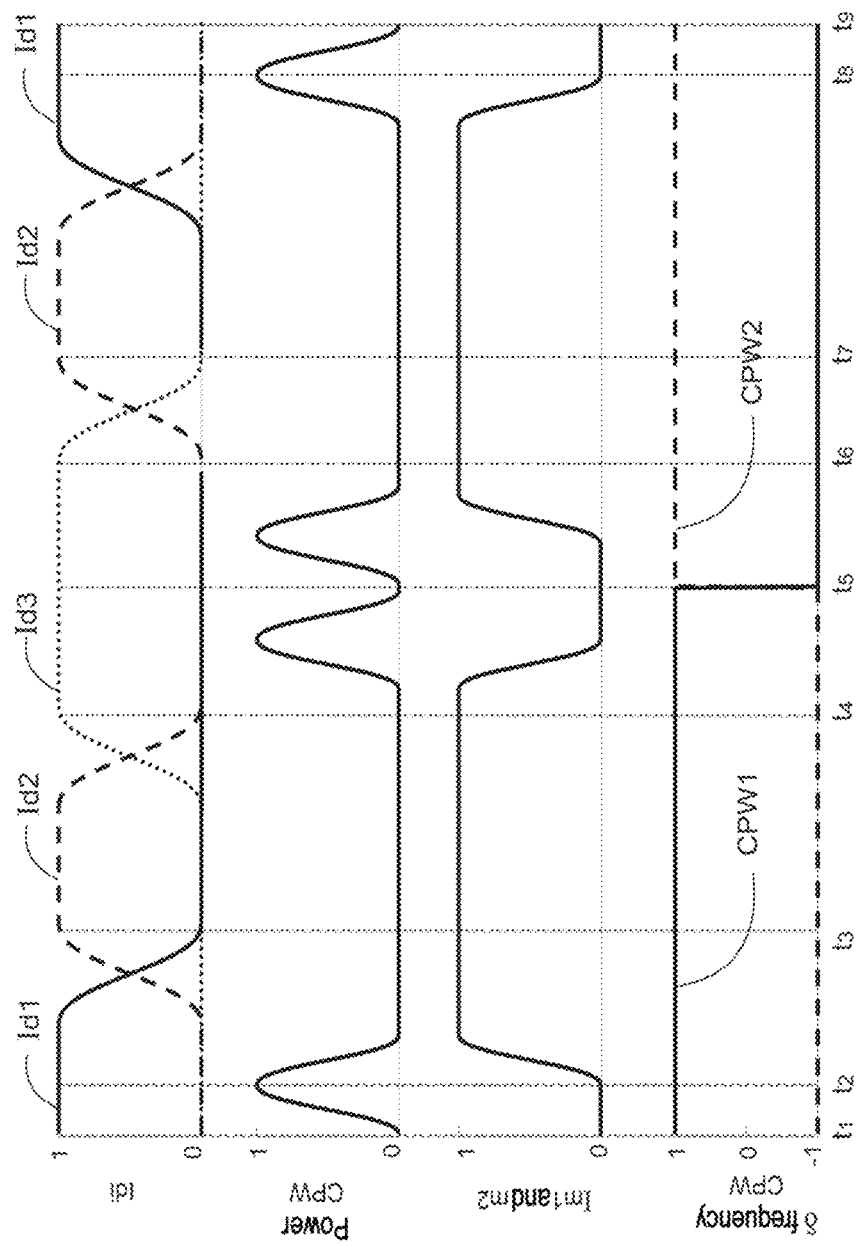
FIG. 15 illustrates a sequence of the various currents applied to the conductive wires, the powers applied to the waveguides and the frequencies applied to the waveguides of the chip, according to this embodiment applied to the first variant of the invention.

FIG. 15 illustrates a sequence of the various currents applied to the conductive wires, the powers applied to the waveguides and the frequencies applied to the waveguides of the chip, according to this other embodiment of the invention applied to the first variant.

The microwave power is no longer applied continuously between $t_2$ and $t_4$ and between $t_6$ and $t_8$, as in FIG. 6, but in the form of pulses at $t_2$, before $t_5$ and then after $t_5$ and at $t_8$:

Between $t_1$ and $t_5$:
  between $t_1$ and $t_2$ the microwave power is gradually increased from zero to its maximum value. Once the maximum value is reached at $t_2$, the microwave power is gradually reduced to zero; at the same time the currents Im1 and Im2 flowing through the wires WIm1 and WIm2 are gradually increased from 0 to their maximum values.

before $t_5$ the currents Im1 and Im2 flowing through the wires WIm1 and WIm2 are gradually turned off, and at the same time the microwave power is gradually activated before being turned off.

Between $t_5$ and $t_9$:

after $t_5$ the microwave power is gradually increased from zero to its maximum value. Once the maximum value is reached, the microwave power is gradually reduced to zero; at the same time the currents Im1 and Im2 flowing through the wires WIm1 and WIm2 are gradually increased from 0 to their maximum values.

before $t_9$ the currents Im1 and Im2 flowing through the wires WIm1 and WIm2 are gradually turned off, and at the same time the microwave power is gradually activated before being turned off.

This variant makes it possible to overcome problems of stabilization of microwave powers. Specifically, the microwave power is used only to perform the separation and the recombination of the clouds of ultra-cold atoms in the internal states |a> and |b>; once the separation has been performed, the traps T1 and T2 are created only for example for the variance shown in FIGS. 13a-13b by the set of wires WIz, WIm1, WIm2 and WIdi that are flowed through by DC currents that are more easy to stabilize.

Advantageously, the wires WIm1 and WIm2 are parallel with the waveguides, so as to create the traps T1 and T2 at a position identical to the first variant shown in FIG. 4 and that does not have the third set of wires.

FIG. 16 illustrates this other embodiment of two additional wires that are coplanar with the waveguides, applied to the second variant of the invention.

Figure 17:
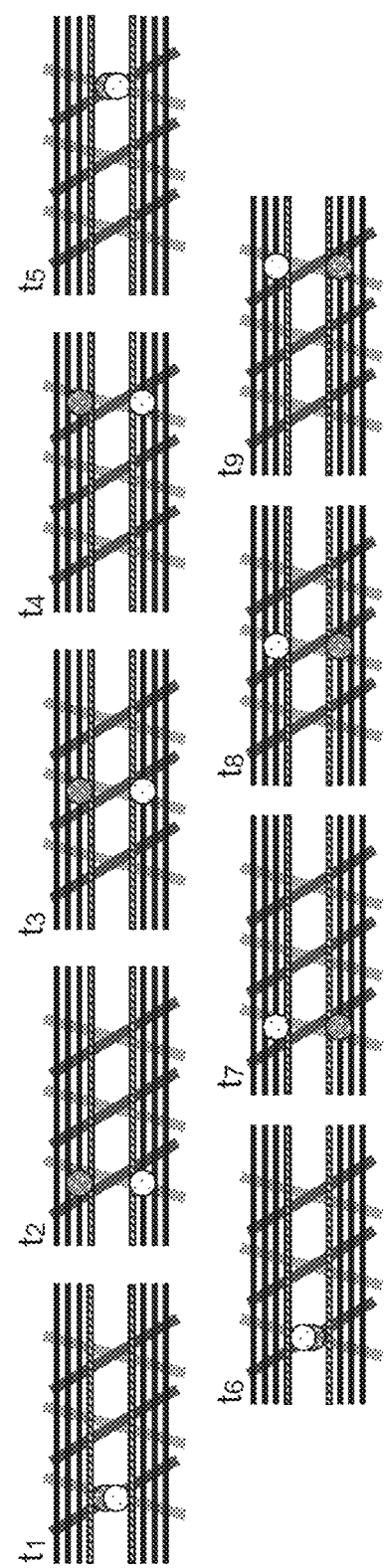
FIG. 17 schematically shows a sequence of the movement of each of the clouds of ultra-cold atoms for this embodiment applied to the second variant of the invention.

FIG. 17 schematically shows a sequence of the movement of each of the clouds of ultra-cold atoms for this embodiment applied to the second variant of the invention, which takes place in a way similar to that of FIG. 8.

Figure 18:
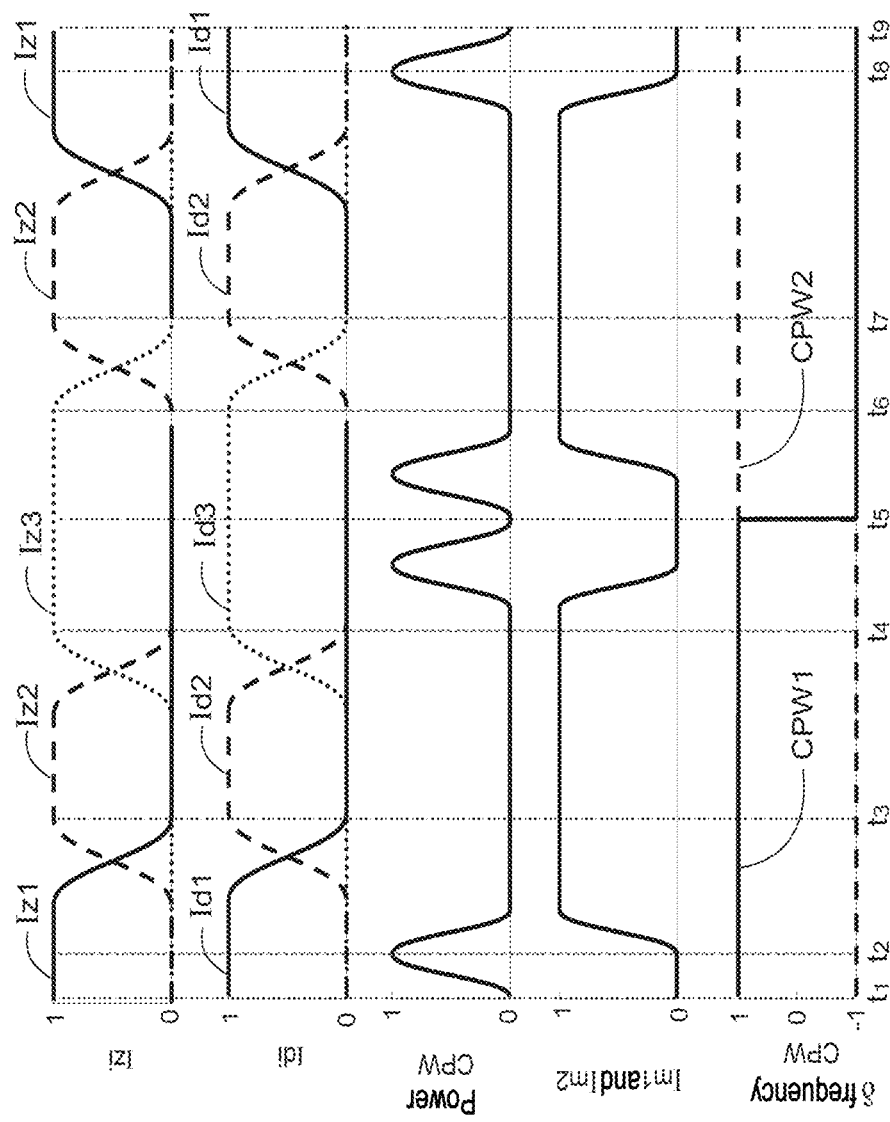
FIG. 18 illustrates a sequence of the various currents applied to the conductive wires, the powers applied to the waveguides and the frequencies applied to the waveguides of the chip, according to this other embodiment of the invention applied to the second variant.

FIG. 18 illustrates a sequence of the various currents applied to the conductive wires, the powers applied to the waveguides and the frequencies applied to the waveguides of the chip, according to this other embodiment of the invention applied to the second variant.

The microwave power is no longer applied continuously between $t_2$ and $t_4$ and between $t_6$ and $t_8$, as in FIG. 9, but in the form of pulses at $t_2$, before $t_5$ and then after $t_5$ and at $t_8$:

Between $t_1$ and $t_5$:

between $t_1$ and $t_2$ the microwave power is gradually increased from zero to its maximum value. Once the maximum value is reached at $t_2$, the microwave power is gradually reduced to zero; at the same time the currents Im1 and Im2 flowing through the wires WIm1 and WIm2 are gradually increased from 0 to their maximum values.

before $t_5$ the currents Im1 and Im2 flowing through the wires WIm1 and WIm2 are gradually turned off, and at the same time the microwave power is gradually activated before being turned off.

Between $t_5$ and $t_9$:

after $t_5$ the microwave power is gradually increased from zero to its maximum value. Once the maximum value is reached, the microwave power is gradually reduced to zero; at the same time the currents Im1 and Im2 flowing through the wires WIm1 and WIm2 are gradually increased from 0 to their maximum values.

before $t_9$ the currents Im1 and Im2 flowing through the wires WIm1 and WIm2 are gradually turned off, and at the same time the microwave power is gradually activated before being turned off.

This variant overcomes the stabilization of the microwave power and offers the advantages, presented above, of the second variant shown in FIG. 7. The wires WIm1 and WIm2 are parallel with the waveguides, so as to create the traps T1 and T2 at a position identical to the third variant shown in FIG. 7 and that does not have the third set of wires.

FIG. 19 illustrates this other embodiment of two additional wires that are coplanar with the waveguides, applied to the third variant of the invention.

Figure 20:
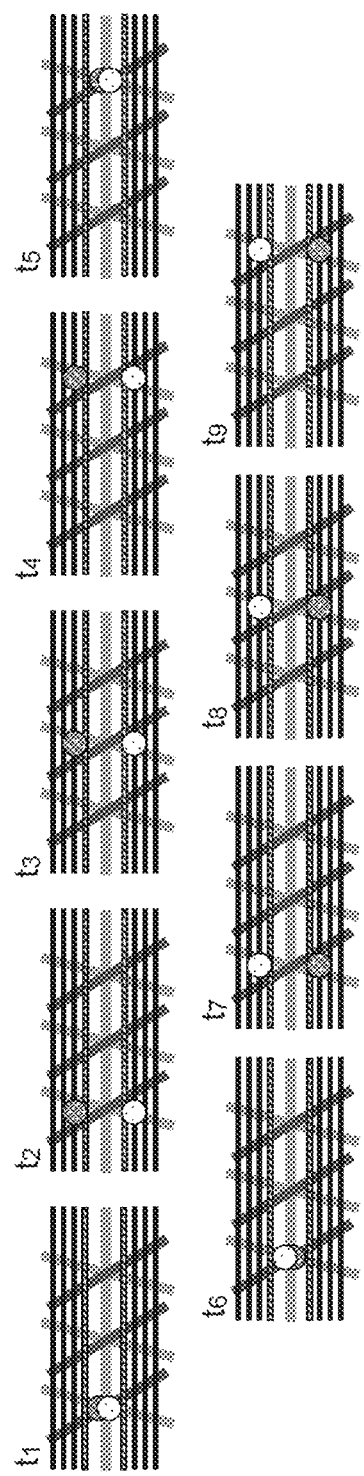
FIG. 20 schematically shows a sequence of the movement of each of the clouds of ultra-cold atoms for this embodiment applied to the third variant of the invention.

FIG. 20 schematically shows a sequence of the movement of each of the clouds of ultra-cold atoms for this embodiment applied to the third variant of the invention, which takes place in a way similar to that of FIG. 11.

Figure 21:
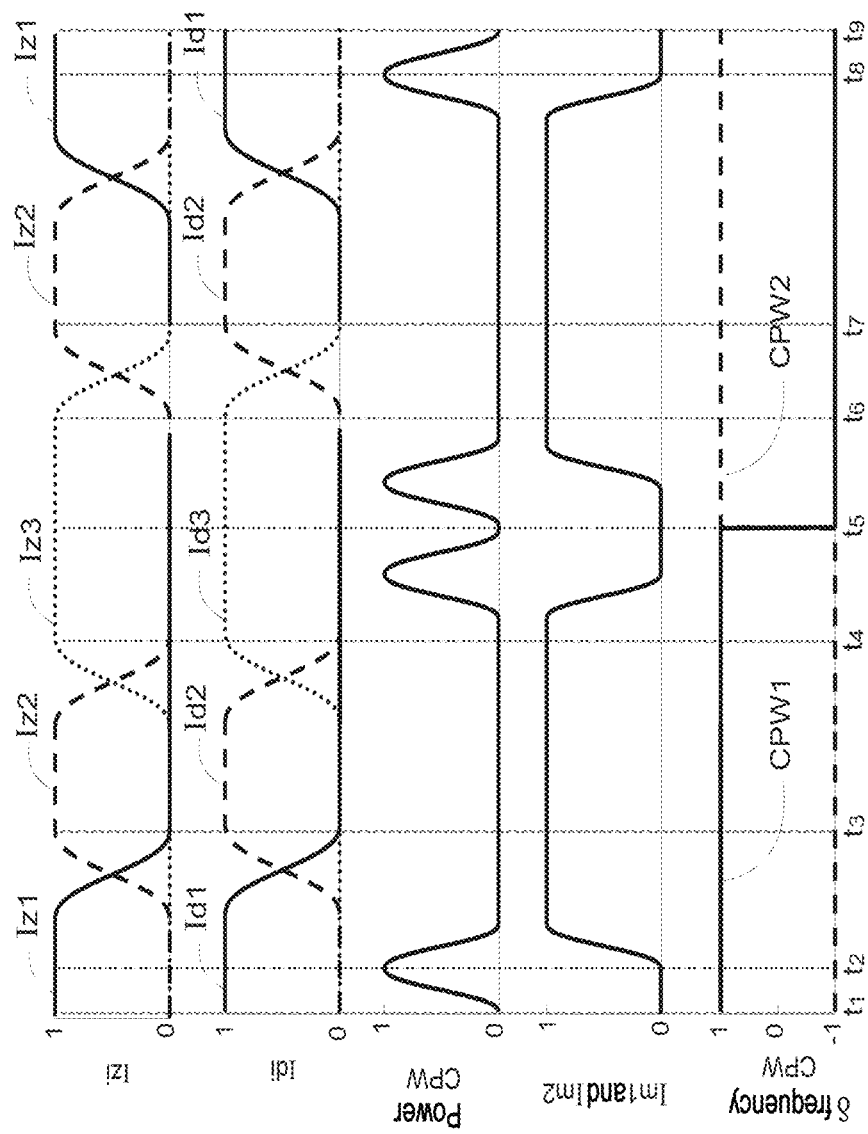
FIG. 21 illustrates a sequence of the various currents applied to the conductive wires, the powers applied to the waveguides and the frequencies applied to the waveguides of the chip, according to this other embodiment of the invention applied to the third variant.

FIG. 21 illustrates a sequence of the various currents applied to the conductive wires, the powers applied to the waveguides and the frequencies applied to the waveguides of the chip, according to this other embodiment of the invention applied to the third variant.

The microwave power is no longer applied continuously between $t_2$ and $t_4$ and between $t_6$ and $t_8$, as in FIG. 12, but in the form of pulses at $t_2$, before $t_5$ and then after $t_5$ and at $t_8$:

Between $t_1$ and $t_5$:

between $t_1$ and $t_2$ the microwave power is gradually increased from zero to its maximum value. Once the maximum value is reached at $t_2$, the microwave power is gradually reduced to zero; at the same time the currents Im1 and Im2 flowing through the wires WIm1 and WIm2 are gradually increased from 0 to their maximum values.

before $t_5$ the currents Im1 and Im2 flowing through the wires WIm1 and WIm2 are gradually turned off, and at the same time the microwave power is gradually activated before being turned off.

Between $t_5$ and $t_9$:

after $t_5$ the microwave power is gradually increased from zero to its maximum value. Once the maximum value is reached, the microwave power is gradually reduced to zero; at the same time the currents Im1 and Im2 flowing through the wires WIm1 and WIm2 are gradually increased from 0 to their maximum values.

before $t_9$ the currents Im1 and Im2 flowing through the wires WIm1 and WIm2 are gradually turned off, and at the same time the microwave power is gradually activated before being turned off.

A DC current $I_Z$ with a constant value is always applied to WIz.

This variant overcomes the stabilization of the microwave power and offers the advantages, presented above, of the third variant shown in FIG. 10.

Advantageously, the wires WIm1 and WIm2 are parallel with the waveguides, so as to create the traps T1 and T2 at a position identical to the third variant shown in FIG. 10 and that does not have the third set of wires.

According to another aspect, the invention relates to a method for measuring a rotational velocity about a given axis 14, using an ultra-cold atom sensor according to the invention, including at least the steps of:

1) generating a cloud of said ultra-cold atoms 12, including phases of dispensing said atoms, of cooling said atoms, of initializing said atoms in at least one said internal state |a> and of trapping a cloud of said ultra-cold atoms in a local potential minimum, at a distance h from said measurement plane, generated by DC currents flowing in two conductive wires defining an initial point of intersection C1;

2) initializing the internal states by coherently superposing said ultra-cold atoms between said states |a> and |b> through a pulse π/2;

3) spatially separating a cloud of atoms in the internal state |a> into a first trap T1 and a cloud of atoms in the internal state |b> into a second trap T2, and moving these traps T1 and T2 in opposing directions along a closed path 16 by:
controlling at least one microwave-frequency current or voltage generator with angular frequencies $\omega_a$ and $\omega_b$ in the two waveguides and by
controlling at least one DC current or voltage generator at the terminals of the conductive wires;

4) recombining the internal states |a> and |b> by applying a pulse π/2 to the ultra-cold atoms and then measuring the density of atoms in an internal state chosen from among at least |a> and |b>;

5) determining the Sagnac phase of said ultra-cold atoms and calculating the rotational velocity of said sensor along said measurement axis 14.

Preferably, the movement of the two traps T1, T2 in opposing directions along said closed path comprises:
applying DC currents to a conductive wire of the first set WIz (single-wire variant) or WIi (plurality of n wires indexed i from 1 to n variant), and to a wire of the second set WIdi, defining what is termed an 'activated' point of intersection Ci, and then successively 'activating' all of the points of intersection so as to move said traps T1, T2 along the axis of symmetry Sy;
applying the microwave powers injected into said waveguides while alternating the angular frequencies $\omega_a$ and $\omega_b$ of the microwaves injected into the waveguides so as to move the traps T1, T2 along an axis that is not parallel to said axis of symmetry Sy.

Advantageously, the temperature of said ultra-cold atoms, with the traps, is adjusted within a temperature range in which a phase shift measured in step 5) is substantially independent of the density of atoms measured in step 4).

The invention claimed is:

1. An ultra-cold atom sensor for measuring a rotational velocity along a measurement axis, said sensor comprising:
an electronic chip positioned in a vacuum chamber and including a measurement plane normal to said measurement axis;
an atom source arranged so as to generate a cloud of ultra-cold atoms close to said measurement plane;
an electromagnetic wave emitter designed to initialize the internal states of said ultra-cold atoms at a superposition of internal states |a> and |b>;
means designed to generate a first and a second ultra-cold atom trap, one trap making it possible to immobilize a cloud of ultra-cold atoms in an internal state different from the other trap, at a predetermined distance from said measurement plane, said means comprising:
at least one first and one second waveguide that are designed to propagate microwaves with angular frequencies $\omega_a$ and $\omega_b$, said waveguides being nonsecant and positioned symmetrically about an axis called the axis of symmetry Sy,
conductive wires integrated into said chip and designed to be flowed through by DC currents, distributed into a first set comprising at least one conductive wire, and a second set comprising a plurality of n conductive wires that are parallel with one another and not parallel with the said axis of symmetry Sy,
said sets being arranged such that the at least one conductive wire of the first set is not parallel with the conductive wires of the second set, defining n points of intersection between any one conductive wire of the first set and one or more conductive wires of the second set, said n points of intersection between the any one conductive wire of the first set and the one or more conductive wires of the second set being located on the axis of symmetry Sy,
a homogeneous magnetic field generator,
an optical intensity detection system designed to measure at least one population of said ultra-cold atoms in one said internal state;
at least one processor, at least one DC current or voltage generator designed to control electric currents in said conductive wires, and at least one microwave current or voltage generator connected to said waveguides,
said means being configured to modify the energy of said ultra-cold atoms in such a way as to create a potential minimum for the ultra-cold atoms in the internal state |a> and a potential minimum for the ultra-cold atoms in the internal state |b>, thus forming said first and second ultra-cold atom traps, and to move said traps along a closed path, traveled in one direction by the ultra-cold atoms of the first trap and in the opposite direction by the ultra-cold atoms of the second trap.

2. The sensor as claimed in claim 1, wherein the temperature of the ultra-cold atoms is greater than 20 nanokelvin and less than 400 nanokelvin.

3. The sensor as claimed in claim 1, wherein the direction of said homogeneous magnetic field is parallel to said measurement plane.

4. The sensor as claimed in claim 1, wherein the two waveguides are parallel with one another.

5. The sensor as claimed in claim 1, wherein the first set consists of a single conductive wire coincident with the axis of symmetry, and wherein each of the said n points of intersection is between the single conductive wire of the first set and one of n conductive wires of the second set.

6. The sensor as claimed in claim 5, wherein the conductive wires of the second set are not perpendicular to the single conductive wire of the first set.

7. The sensor as claimed in claim 1, wherein the first set comprises a plurality of n conductive wires that are parallel with one another, wherein each of said n points of intersection is between one of the n conductive wires of the first set and one of n conductive wires of the second set.

8. The sensor as claimed in claim 7, wherein an angle between the conductive wires of the first set and the conductive wires of the second set is between 30° and 60°.

9. The sensor as claimed in claim 7, wherein the first set furthermore comprises a conductive wire coincident with the axis of symmetry.

10. The sensor as claimed in claim 1, wherein the two waveguides and the conductive wires that are secant to said waveguides are respectively positioned on a first level and a second level that are separated by an insulator.

11. The sensor as claimed in claim 10, wherein all of the conductive wires of the first and of the second set are positioned on the second level.

12. The sensor as claimed in claim 10, further comprising a third set comprising a first and a second conductive wire that are positioned symmetrically about the axis of symmetry and in parallel with the first and with the second waveguides, respectively, and positioned on the first level.

13. The sensor as claimed in claim 1, wherein each said waveguide is chosen from among a microstrip line, a coplanar line and preferably a coplanar line including three conductive wires that are parallel with one another and electrically insulated from the conductive wires of the first and of the second set, and of the third set where applicable.

14. The sensor as claimed in claim 1, wherein said optical intensity detection system is designed to measure, at a single point on said path, at least one population of said ultra-cold atoms in one said internal state.

15. The sensor as claimed in claim 14, wherein said optical intensity detection system includes at least one laser at least one wavelength of which corresponds to an absorption peak of the light intensity by said ultra-cold atoms in one said internal state.

16. The sensor as claimed in claim 1, wherein the difference between the length of said closed path taken by two said traps is less than the de Broglie length of said ultra-cold atoms.

* * * * *